United States Patent [19]
Arnold et al.

[11] Patent Number: 5,551,035
[45] Date of Patent: Aug. 27, 1996

[54] METHOD AND APPARATUS FOR INTER-OBJECT COMMUNICATION IN AN OBJECT-ORIENTED PROGRAM CONTROLLED SYSTEM

[75] Inventors: Erich C. Arnold, Glen Ellyn; Olivia M. Gagliardi, Wheaton; Wayne E. Hyatt, Glenview; Lawrence G. Mayka, Aurora; Todd C. Morgan, Oak Park, all of Ill.

[73] Assignee: Lucent Technologies Inc., Murray Hill, N.J.

[21] Appl. No.: 405,578

[22] Filed: Mar. 16, 1995

Related U.S. Application Data

[63] Continuation of Ser. No. 871,607, Apr. 20, 1992, abandoned, which is a continuation-in-part of Ser. No. 374,501, Jun. 30, 1989, abandoned.

[51] Int. Cl.$^6$ .................................................. G06F 15/16
[52] U.S. Cl. ............... 395/650; 395/200.01; 364/DIG. 1; 364/222.3; 364/229; 364/281.6; 364/281.8; 364/284.3
[58] Field of Search ................................ 395/200.01, 650

[56] References Cited

U.S. PATENT DOCUMENTS

| 4,423,414 | 12/1983 | Bryant et al. ............... 340/825.07 |
| 4,500,960 | 2/1985 | Babecki et al. ..................... 364/200 |
| 4,597,078 | 6/1986 | Kempf ......................... 370/94 |
| 4,694,396 | 9/1987 | Weisshaar et al. ............. 364/200 X |
| 4,710,926 | 12/1987 | Brown et al. .......................... 371/9 |
| 4,718,005 | 1/1988 | Feigenbaum et al. .............. 364/200 |

FOREIGN PATENT DOCUMENTS

| 881010904 | 1/1988 | European Pat. Off. . |
| 1-126736 | 5/1989 | Japan . |

OTHER PUBLICATIONS

9th International Conference on Distributed Compting Systems, Jun. 5, 1989, Newport Beach, US, pp. 550–559, A. P. Black, et al., "Implementing Location Independent Invocation".

(List continued on next page.)

Primary Examiner—Kevin A. Kriess
Assistant Examiner—Kakali Chaki
Attorney, Agent, or Firm—Michael B. Johannesen

[57] ABSTRACT

In a telecommunication switching system the telecommunication software is implemented by means of independent software components referred to as objects. The objects communicate with each other by messages and symbolic names only. A runtime system includes a runtime linker which registers the systems components and records a data pointer to the components data. To communicate with another object, a source object transmits an executable expression, called a message, to the runtime system. The message includes the symbolic name and the identity of the method of the destination object. The runtime system serves only a single processor or group of objects and calls the destination object, by means of the identity of the method and the data pointer if the destination object is within the group of objects served by the runtime system. In the case a destination object is located on another processor, the runtime system will broadcast the message to other processors. In each of the receiving processors, the runtime system searches its linker table for the symbolic name of the destination object of the message and if found calls the destination object on the basis of the method identification in the message and the data pointer information in the runtime linker. Interprocessor messages include a source processor designation and the run system of each of the processors records the name of the source processor and the symbolic name of the source object when an interprocessor message is received. This table is consulted before broadcasting a message to a non-resident destination object and a direct processor-to-processor communication is established, instead of a broadcast, if the symbolic name of the destination object is recorded together with the corresponding processor identification, in the destination table.

9 Claims, 15 Drawing Sheets

OTHER PUBLICATIONS

IEEE Transaction on Nuclear Science, vol. NS–34, No. 4, Aug. 1987, New York, US, pp. 858–864, G. G. Preckshot, et al., "A Simple and Efficient Interprocess Communication System for Actually Using a Laboratory Computer Network".

8th International Conference on Distributed Computing Systems, Jun. 13, 1988, San Jose, US, pp. 18–24, K. Shimizu, et al., "Hierarchical Object Groups in Distributed Operating Systems".

Bergeron, R. F., et al., "Automated Repair Service Bureau: Software Tools and Components", vol. 61, No. 6, Part 2, Jul.–Aug. 1982, *The Bell System Technical Journal*, pp. 1177–1195.

Swinehart, D. C. et al., "The Structure of Cedar", vol. 20, No. 7, Jul. 1985, *ACM SIGPLAN Notices*, pp. 230–244.

Donahue, J., "Integration Mechanisms in Cedar", vol. 20, No. 7, Jul. 1985, *ACM SIGPLAN Notices*, pp. 245–251.

Goldberg, A., et al., *Smalltalk–80 The Language and Its Implementation*, Addison–Wesley Publishing Company, 1983, pp. 5–16.

Herlihy, M., et al., "A Value Transmission Method for Abstract Data Types", vol. 4, No. 4, Oct. 1982, *ACM Transactions on Programming Languages and Systems*, pp. 527–551.

Rowe, L. A., "Data Abstraction from a Programming Language Viewpoint", vol. 16, No. 1, Jan. 1981, *ACM SIGPLAN Notices*, pp. 29–35.

*2A Symbolics Common Lisp—Language Concepts*, Cambridge, Massachusetts, Feb. 1988, pp. 45–54.

Brown, D. W., et al., "Software Specification and Prototyping Technologies", vol. 67, No. 4, Jul./Aug. 1988, *AT&T Technical Journal*, pp. 33–45.

"Work–Station LAN Masters Many Operating Systems" Hamilton et al., Electronic Design, vol. 31, No. 36, Dec. 1983, pp. 127–135.

INTERRUPT QUEUE

CLOCK QUEUE

DISPATCH QUEUE

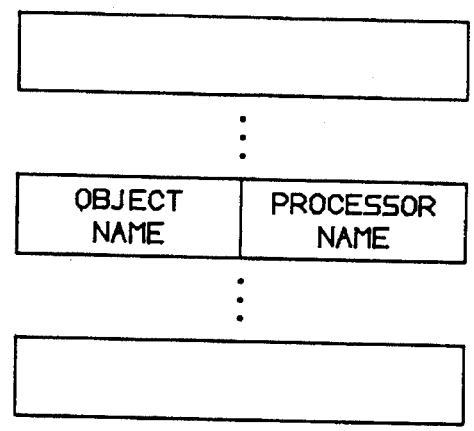
DESTINATION TABLE
FIG. 16
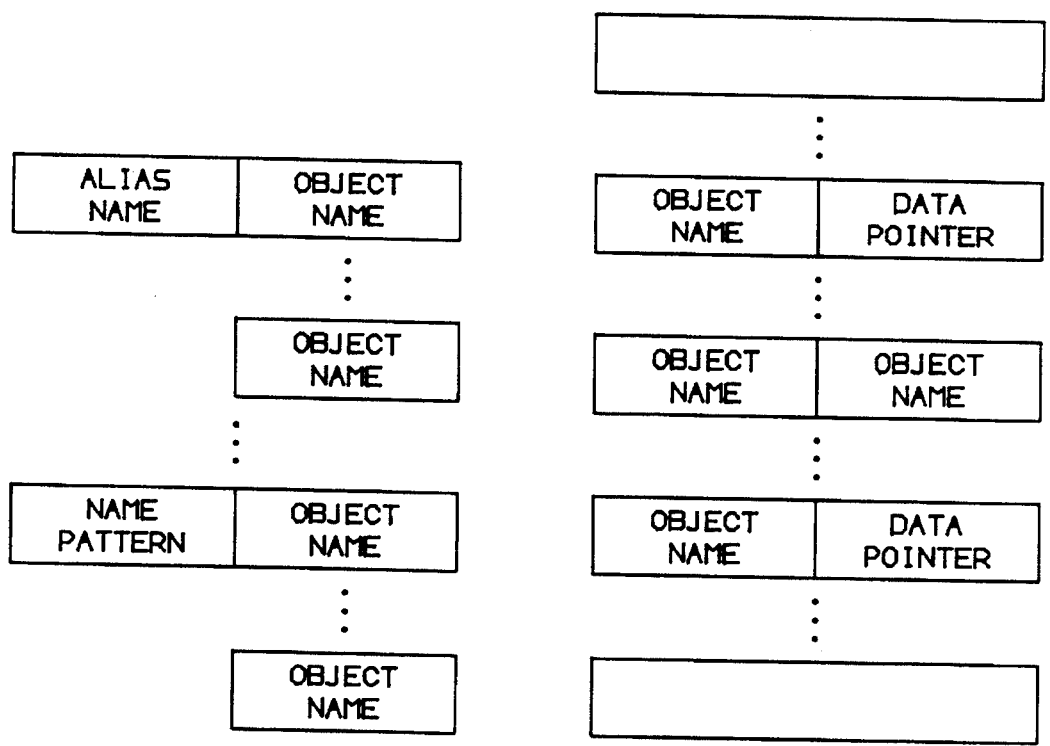
ALIAS TABLE
FIG. 17
RTL TABLE
FIG. 18

METHOD AND APPARATUS FOR INTER-OBJECT COMMUNICATION IN AN OBJECT-ORIENTED PROGRAM CONTROLLED SYSTEM

This application is a continuation of application Ser. No. 07/871,607 filed on Apr. 20, 1992 abandoned, which is a continuation-in-part of application Ser. No. 07/374,501, filed on Jun. 30, 1989 now abandoned.

BACKGROUND OF THE INVENTION

It is well-known that large software systems, for example, software for controlling a large telecommunication system is complex and costly to build. In an effort to alleviate this problem, large software systems are commonly divided into segments or components. However, the various components of todays large software systems are tied inextricably to one another by dependencies which cause a great deal of coordination and negotiation among the developers of the software system and often force them to synchronize their work efforts, slowing down the development of a project. Typically, the developer must investigate syntactic issues such as how a particular global data structure is laid out or what order of arguments another developer's function demands. Such interdependencies add to the cost and the development time of the large and complex systems. Before a program can be loaded into a machine it must be compiled, that is, converted from the source code format in which the programmer typically writes the program to the object code format which will be recognized by the machine. Compiling includes computing proper addresses of other programs and data areas with which the compiled program communicates. Thus, compiling cannot be done until all associated programs are fully defined. Similarly, a single developer's compiled program cannot be tested on the machine until all the other programs with which this program communicates have been written and are functioning on the same machine. Similar restrictions are in effect when a change is made in a program. For example, when a change is made to a program component which is used by other program components, the other programs which are dependent on the revised component must be recompiled as well. To properly integrate a change in conventional systems, the entire system program should be recompiled, although certain limited changes can sometimes be made. In large systems compiling can usually be done only on off-line computers. Thus, it is difficult and time consuming to introduce changes in a large program controlled system such as a telecommunications switching system after it has been installed in the field. The interdependencies of program components which are found in present day systems were recognized many years ago as adding to the complexities, time and costs of developing or modifying a complex software system. Some but not all of the problems of interdependency are solved by the known LISP language. However, LISP is generally not considered to be slow for real time systems. Today it is recognized that software absorbs more than 80 percent of development time and cost of a major computer based system. Accordingly, improvements in software technology are greatly sought after.

SUMMARY OF THE INVENTION

In accordance with this invention an improved software structure is provided by means of a linking mechanism which allows software components to communicate using symbolic names instead of addresses related to the physical characteristics of the system. An interprogram communication protocol in accordance with this invention employs executable expressions using only symbolic names. Advantageously, this protocol makes possible the independent development of communicating software components. In accordance with this invention, one program entity does not need to know the address of another entity. Neither do the sending and receiving programs have to be on the same processor, nor do they need to know whether or not they are on the same processor. Furthermore, interprogram communication by means of the executable expression provides for asynchronous communication, allowing a sender to proceed without a need to wait for reply, which is of utmost importance in a real time system such as a stimulus driven communication switching system. Advantageously, to the receiving program executable expression is received in the same manner as a method invocation. This allows the receiver program to be written as if it were invoked by the usual method invocation mechanism, while the compile time independence of software components is maintained.

In one embodiment of the invention a linking mechanism, called a runtime linker provides communication between independent program entities referred to herein as objects. The runtime linker includes tables for the conversion of symbolic object names to system address designations. In the system of this invention, the objects do not communicate directly With each other, but all communicate via the runtime linker by transmitting to the runtime linker the symbolic name of a called object and information to be transferred. The runtime linker responds by invoking the called objects at the called objects system address. The interobject message structure in accordance with one embodiment of this invention, includes the symbolic name of the destination object, the symbolic name of the method of the destination object to be executed and the symbolic name of the sending object. The message provides the name of the sending object to the executing object, to be used by the receiving as a destination for a response message. Advantageously, the use of only symbolic names to effect intercomponent communication allows one to replace an existing object with a new one possibly having additional functionality, without disturbing the rest of the software. Further in accordance with this invention, call processing software for a telecommunications switching system is partitioned into independent objects each for performing specified call handling functions pertaining to selected facilities such as lines, trunks etc. The objects of the call processing software communicate via executable expressions (messages) by means of a runtime system which passes messages between objects on the same processor or on different processors of a multiprocessor system.

BRIEF DESCRIPTION OF THE DRAWING

The invention may be more fully understood from the following detailed description when read with reference to the drawing in which:

FIGS. 13 through 18 are representations of tables and queues in the illustrative system.

DETAILED DESCRIPTION

Figure 1:
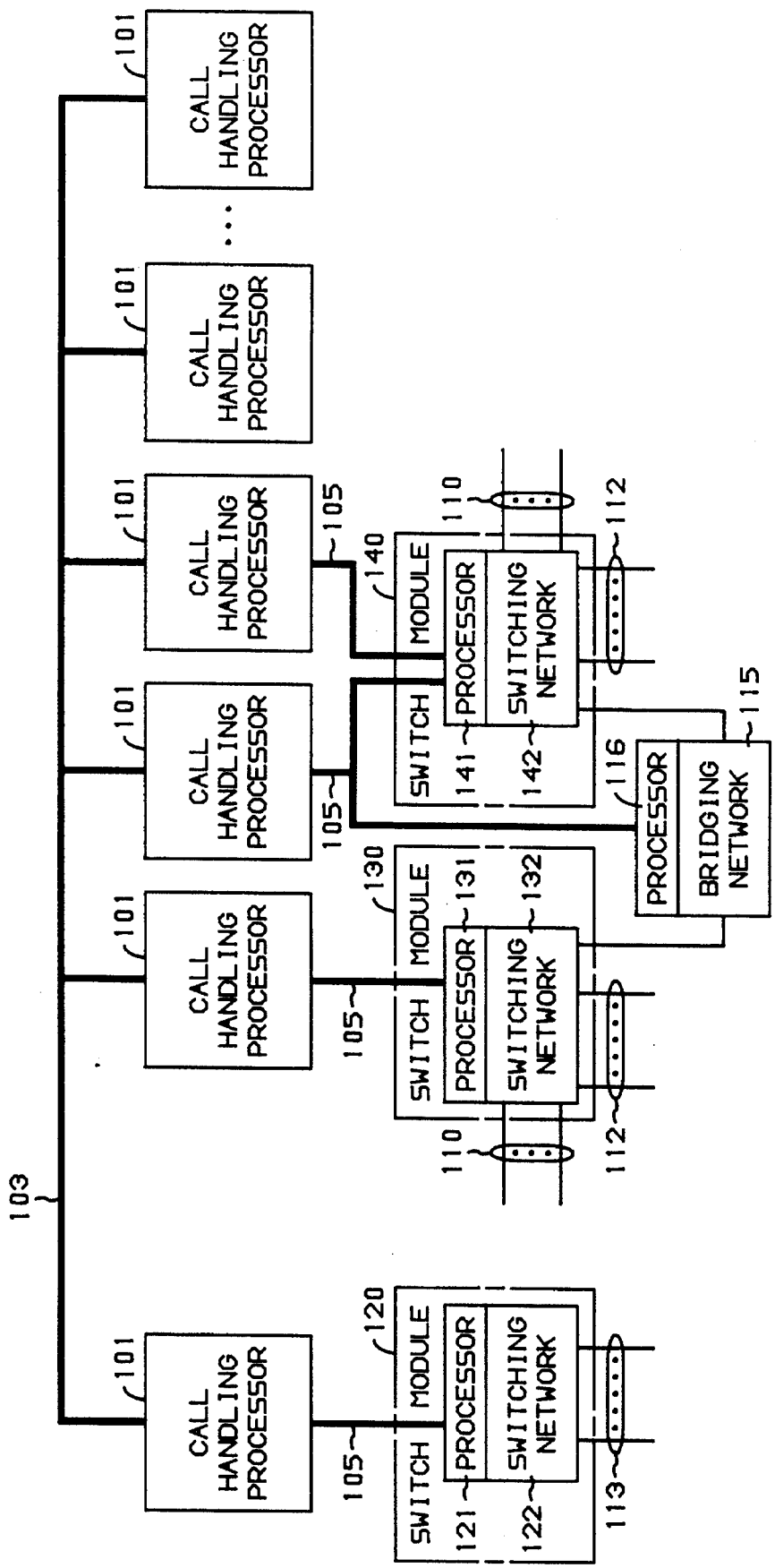
FIG. 1 is a block diagram representation of an illustrative telecommunication switching system embodying the invention.

FIG. 1 is a block diagram representation of an illustrative distributed telecommunications switching system which is used to illustrate the principles of the invention. The system comprises a plurality of processors 101, each of which is equipped with a runtime system and object oriented application software for carrying out telecommunications functions. The processors 101 are interconnected by a bus 103 having broadcast capability such as for example the well-known ETHERNET local area network. The application software may be resident in a single processor or distributed over the various processors 101. Certain application software, such as the objects communicating with peripheral devices, are preferably located in processors which have physical connections to the peripheral devices, for example, via interconnecting buses 105. The processors 101 may, for example be the IVORY computer of Symbolics Company or the MICROEXPLORER processor of Texas Instruments Company, adapted to run Common LISP.

In the illustrative embodiment of FIG. 1, three switch modules 120, 130 and 140, comprises processors 121, 131 and 141, respectively, and comprising switching networks 122, 132, 142, respectively. The switching networks 132, 142 may be connected to subscriber lines 110 or interoffice trunks 112. The switching network 122 may be dedicated to special services, such as interconnecting broadband lines designed for handling video. The processors 121, 131 and 141 may, for example be Motorola 68000 processors and preferably programmed in a lower level language such as the well-known C language and using for example a real time version of the AT&T UNIX® operating system. The switching networks 122, 132 and 142 include the necessary and well-known line and trunk interface circuitry as well as switching fabric for performing interconnections. A further switching network, bridging network 115, is provided to interconnect the network switches 132 and 142 to provide paths between lines and trunks of the two different switching modules. Known switching systems may have a variety of switching modules, many of them interconnectable by a switching network such as network 115. The switching modules 120, 130 and 140 of FIG. 1 may, for example, be the switching modules of the AT&T 5ESS® Switch as described in the AT&T Technical Journal, July-August 1985, Vol 64, No. 6, part 2 or switching modules as described in U.S. Pat. No. 4,592,048. The interconnecting switch 115 may be a time multiplexed switch as described in that patent and controlled by a known control processor 116. The lines 110 and trunks 112 connected to switch modules 130 and 140 may be standard analog or digital lines and trunks.

In a system in accordance with this invention, software functions may be partitioned into lower level functions, more closely tied to the peripheral hardware, and higher level functions which are more hardware independent and may be more readily executed in a higher level software environment such as LISP. The processors 116, 121, 131 and 141 are preferably used to perform low level functions such as controlling the networks and other functions such as detecting call origination, flashes, call termination as well as performing the functions of collecting digits and providing alerting and dial tone signals on the associated lines and trunks, as required. These functions are customarily performed in stored program controlled switching systems and are well-known in the art. In the present arrangement, the processors 101 communicate with the switching module processors and perform higher level, hardware independent communication functions required to provide communication services.

Figure 2:
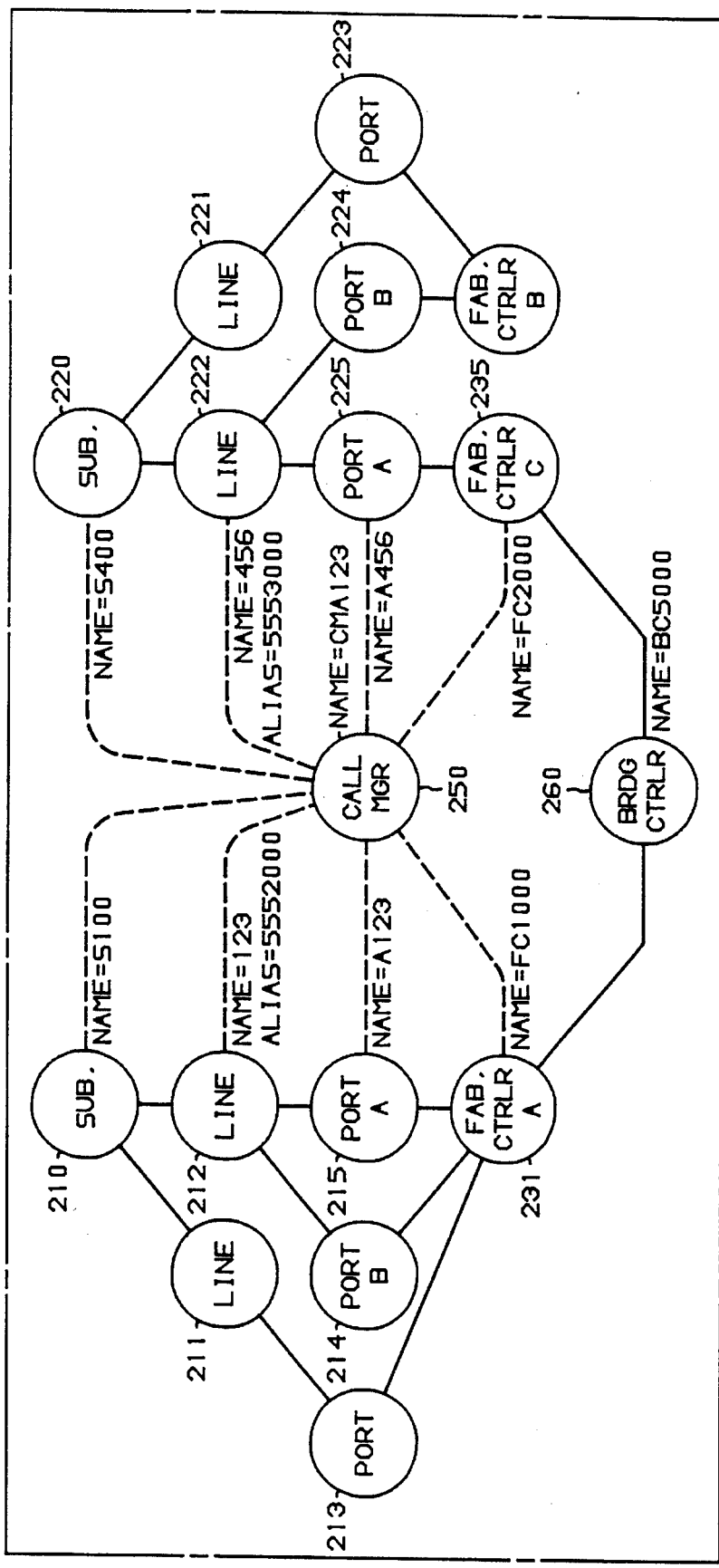
FIGS. 2 and 6 are pictorial representations of portions of the application software for controlling the switching system of FIG. 1.

FIG. 2 is a pictorial representation of a portion of the application software for carrying out higher level communication functions, resident in the LISP processors 101. A basic unit in the call processing software structure is a group of related software components called objects. Each of the objects in the system has a unique name, a set of operations called methods and a state called instance data. Communications between objects is by messages wherein information elements are represented as keywords and value pairs; keywords are represented by symbols and values are represented by a set of self-describing data types, i.e. symbols, numbers, strings or a list of these values, as is commonly done in LISP. All messages identify the symbolic name of the receiver, the symbolic name of the sender, the symbolic name of the method of the receiver to be given control upon this path of the message, and a list of arguments which are expected by the receiving method. Each of the processors 101 has a runtime software system by which the messages are passed between objects, as discussed in greater detail with respect to FIGS. 10 through 12. When a message is passed between components which are in the same processor, the runtime system converts the symbolic names to system addresses and passes the message to the intended receiver. If the intended receiver is not found in the processor of the originating object, the runtime system of the originating processor transmits the message to the receiving processor and the runtime system of the receiving processor translates the symbolic names into system addresses. The sender and receiver objects communicate directly only with the resident runtime system and are not affected by the fact that interprocessor communication takes place.

Objects may be characterized as static or dynamic. Static objects comprise the telecommunication switching office configuration and are in existence independent of any call activity within the office. Dynamic objects are created on a temporary basis, such as, for the duration of a call. Objects may be linked to each other by static links or dynamic links. A static link exists only between static components and may be considered part of the office configuration. Dynamic links may exist between two static components, two dynamic components or a static and a dynamic component. Dynamic links are established only for a specific purpose such as passing messages for the duration of a specific call. Objects are created by the runtime system from a component class defined by a programmer in the software development environment, as a template for how the component instance will be constituted in the target system. The class includes a definition of the instance of data elements which are managed by the component and the set of methods (program text) which have exclusive access to the instance data. Static objects are created in the system when the office configuration is initiated or modified. Dynamic objects are created for a specific purpose, such as a specific telephone call and are destroyed when the call is terminated.

For each active subscriber of the system having at least one active telephone line connected to at least one telecommunications terminal, there exist at least three related objects. These are known as the subscriber object, the line object, and the port object. A subscriber may have more than one line and a separate line object is provided for each line assigned to the subscriber. Furthermore, a line may have more than one associated port object. For example, an ISDN digital subscriber line may have more than one terminal, and a separate port object is provided for each such terminal. A port object is created on the processor 101 for each available line or trunk termination of the system. Line and subscriber objects are created when subscribers are assigned to the ports. Line objects are linked to their related subscriber and port objects by bidirectional static links which remain as long as the relationship exists. This static linking is shown in FIG. 2 with solid lines, while dynamic linking, e.g. for the duration of a call, is shown by dotted lines. A port object represents the physical appearance of a subscriber's terminal equipment and communicates with the processor of the switch module to which the terminal equipment is physically connected. Where the subscriber is connected to the switch via an ISDN digital subscriber line, the port object is responsible for the D channel signaling interface. A line object represents the logical network address and is responsible for network routing and line specific features. A subscriber object is responsible for billing, call screening and other features common to all lines owned by the subscriber. The various objects shown in FIG. 2 may be distributed over several of the host processors 101 independent of their linking. For the sake of efficiency, the port objects are preferably resident in the ones of processors 101 which are connected via bus 105 to the switch module to which the associated terminal equipment is connected.

The following will illustrate the interactions of the various objects in the establishment of an illustrative call between two subscribers. By way of example, it will be assumed that a call is originated from a port associated with directory number 555-2000 and is directed to directory number 555-3000. The sequence of this illustrative call will be described with respect to FIGS. 2 through 5. As indicated in block 501 of FIG. 3, the processing of a call in the high-level object-oriented application software is initiated by the detection by one of the port objects of an origination request. The originating subscriber may, for example, be connected to one of the subscriber lines 110 of switch module 130. Call origination by, for example, an off-hook signal on an analog line is detected by means of well-known scanners or the like and associated low level software incorporated in the switch module 130, in a standard and well-known way. An origination request message is transmitted from module 130 via the runtime system of the the associated one of the processors 101 to the port object. In this example, the associated port object is labeled port A, shown at 215 in FIG. 2. Port object 215 sends a message reflecting the detected origination request to the associated line object shown at 212, which is the originating line object referred to in block 502 of FIG. 3. An exemplary message is shown in Table A. The line object 212 creates a call manager object 250 as shown in block 504. Creation of the call manager is done by means of a message from the line object to the local runtime system by providing the class name of the desired object and an optional object name designation. In this illustrative system the call manager is a dynamic object which will remain in existence only for the duration of one call and will destruct when the call is terminated. After the call manager 250 has been created, the line object 212 sends the name, S100, of the associated subscriber object 210 and the name, A123, of the associated port object 215 to call manger 250, as reflected in block 506 of FIG. 3. An exemplary message is shown in Table A, message 2. The call manager knows the name of the line object, which created the manager by virtue of the communications originating from the line object, which includes the name of the caller.

The call manager 250 transmits a message via the runtime system to port object 215 with the name A123, which the call manager received earlier from the associated line object 212. The message instructs the port object to collect digits, as reflected in block 508 of FIG. 3. The digits may be collected in a well-known manner in the associated switching module, which is module 130 in this example, and transmitted to the port object. In this example, the collected digits represent the number 555-3000 of a subscriber connected to one of the subscriber lines 110 of switching module 140. The port object 215 transmits the collected digits to the call manager 250 together with the name of its associated fabric controller object, as reflected in block 509. An exemplary message is shown in Table A, message 3.

Associated with the switching networks 122, 132, 142 are the fabric controller object 230, 231, and 235, respectively. The fabric controller derives network connection information from the calling and called port and channel information provided to it and transmits the derived information to the appropriate processor for controlling the associated network to establish the desired interconnection. In the event that the two ports involved in a call are in the same switching module, only one fabric controller object is involved in the call. However, if the originating subscriber port is connected to one switch module and the terminating subscriber port is connected to another switch module, originating and terminating fabric controller objects are involved. Furthermore, when two switch modules are involved in a call, a connection must be established between them through the interconnecting switching network 115. The switching network 115 is controlled by processor 116 connected to one of the call handling processors 101 via one of the busses 105. The switching network and processor represent a separate physical resource to the system and a software object designated by the number 250 in FIG. 2 and referred to as a bridge controller, communicates connection information to the processor 116. The bridge controller receives messages from fabric controllers involved in a call to generate connection information for the bridging network 115. Since the switching networks 122, 132 and 142 and the bridging network 115 are physical resources, the fabric controllers and bridge controller corresponding to the networks are created at the time that the physical resource is added to the system. Likewise, port objects are generated at the time that the network terminations are added to the system and the name of the fabric controller which is associated with the port is recorded in the port object. Similarly, the name of the bridge controller 250 is provided to the fabric controllers which may need to call the bridge controller object to obtain connections through the bridging network.

The name of the originating fabric controller passed to the call manager 250, indicated in block 509, is in this illustrative example FC1000, the name of fabric controller 231. As indicated in block 510 of FIG. 3 the call manager broadcasts an incoming call message, using the name of the terminating line object, 555-3000. An exemplary message is shown in Table A, message 4. If 555-3000 is in fact an active number in the switching system, there will exist a line object which has that name. All messages, including the broadcast message from the call manager 250 are transmitted through the runtime system. Broadcast messages are distributed via bus 103 to each of the processors and the runtime system of each processor receives and analyzes the alias name. When a runtime system recognizes the broadcast name as belonging to an object on its processor, the message is transmitted by that runtime system to the addressed object and is received, as reflected in block 512 of FIG. 3. In this example, line object 222 is the terminating line object with the broadcast alias name 555-3000, and receives the message.

Figure 3:
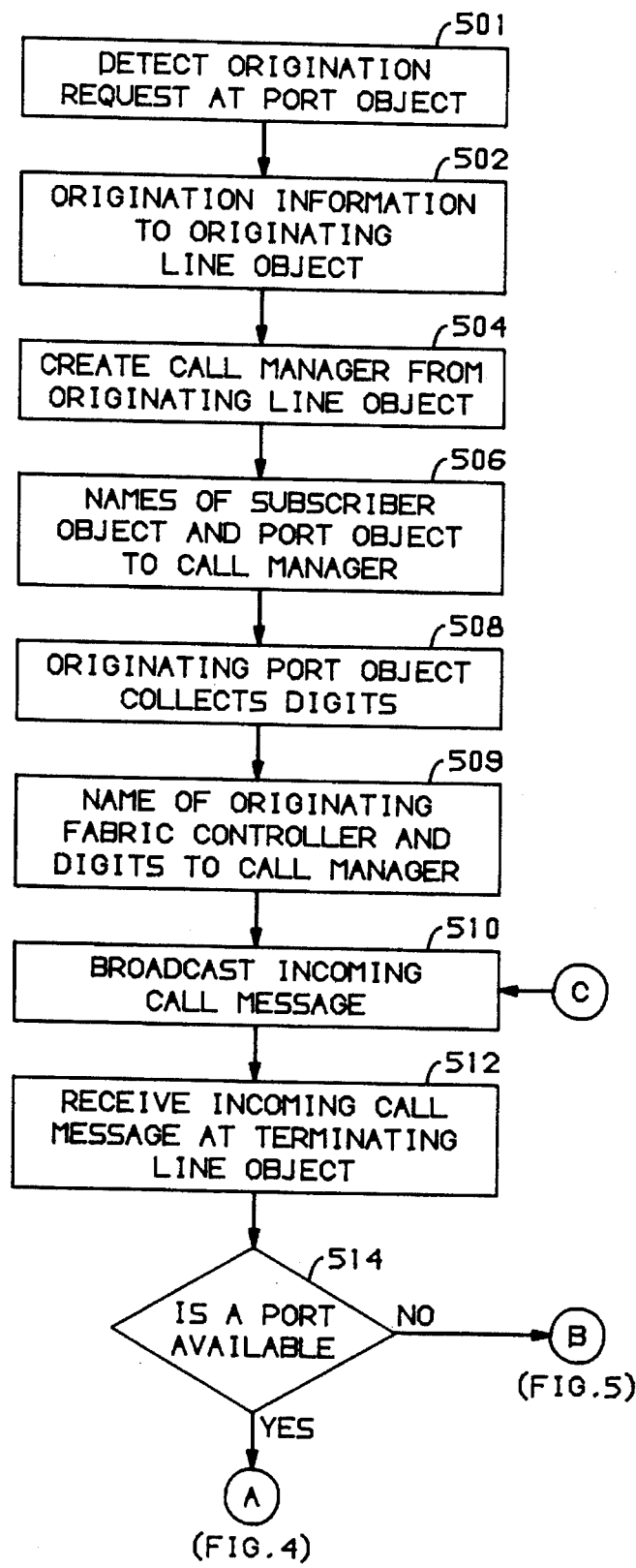
FIGS. 3 through 5, 7 and 8 are a flow chart representation of the functions of the application software in completion of an illustrative call.

The terminating line object 222, having received the broadcast message with the alias name 555-3000, tests to determine whether one of the two ports, port A or port B associated with this line is available, as reflected in block 514 in FIG. 3. If a port is available, the terminating line object 222 transmits a "Route Complete" message to the call manager 250, as reflected in box 516 in FIG. 4. The message includes the name of the terminating port object, for example A456, and the name of the terminating subscriber object, for example $400. These names are known to the line object because of linking that was included in the object at the time that the subscriber and line objects were created. An exemplary message is shown in Table A, message 5. As indicated in block 518 of FIG. 4, the call manager 250 sends an alerting message (Table A, message 6) to terminating port object 225 with the name A456 to cause that port to provide an alerting signal to its associated subscriber terminal and also sends a message (Table A, message 7) to the originating port object 215 with the name A123 to cause its associated subscriber terminal to receive an audible ringing signal. The terminating port object 225 sends a message (Table A, message 8) with the name of the associated fabric controller 235, FC2000, to the call manager 250, as indicated in block 520, and waits for an off-hook signal. In the meantime, as indicated in block 521, the call manager 250 sends messages (Table A, messages 9 and 10) to the fabric controllers 231 and 235 to cause them to reserve a path for the completion of a call. In this example, the calling subscriber is connected to a module 130 and the called subscriber is connected to module 140 (FIG. 1). Accordingly, this exemplary call involves switching networks 132 and 142, and bridging network 115. Fabric controller object 231 controls switching network 132 by messages via bus 105 to processor 131, fabric controller 235 controls switching network 142 by messages via bus 105 to processor 141, and bridge controller 250 controls bridging network 115 by messages via bus 105 to processor 116. Each fabric controller comprises the programs and data for selecting an available path through its associated network is response to a message defining the name of a port object associated with the network and the name of the bridging controller. Table A message 9 is an exemplary message sent from call manager 250 (CMA123) to controller 231 (FC1000) naming port object 215 (A123) and fabric controller 260 (BC5000). Table A message 10 shows an analogous message sent to fabric controller 235. Such messages are transmitted as indicated in block 521. Each fabric controller selects a path through its associated network from the network terminal associated with the identified port object to an interconnecting link to the bridging network and send a message to the bridging controller 260 identifying the selected link and the identity of the call. The identity of the call may be chosen to be the same as the name of the call manager (CMA123) since it is a unique name and the call manager exists only for the duration of the call. Messages 11 and 12 of Table A represent messages transmitted from fabric controller 231 (FC1000) and 235 (FC2000), respectively, to bridge controller 260 (BC5000), reserving a path with the bridge controller a indicated in block 522. The message identifies the call (CMA123) and the network links (X,Y) selected by the fabric controllers.

After having received an alert message from the call manager to apply an alerting signal to the associated terminal, as indicated in block 518, the port object 225 waits for an off-hook indication from the terminal associated circuitry and corresponding software in switching module 140. Upon receipt of the off-hook indication, the terminating port object 225 (A456) sends an off-hook message (Table A, message 13) to the call manager 250 (CMA123) when the off-hook is detected as indicated in block 524, of FIG. 4. Thereafter, the call manager 250 (CMA123) sends a message (Table A, message 14) to the originating port object 215 (A123) to stop sending audible signals to the originating subscriber, sends messages (Table A, message 15, 16) to the fabric controllers (FC1000, FC2000) to make a connection via the reserved path and sends a message (Table A, messages 17 and 18) to the subscriber objects 210 and 220 that a call has been established for billing purposes. The actions are indicated generally in block 526 shown in FIG. 4. The fabric controllers (FC1000, FC2000) send connect messages (Table A, message 19, 20) to the bridge controller (BC5000) as indicated in block 527 of FIG. 4.

At this point, a call has been established and stable call audits may be performed by the port objects and the fabric controller objects by sending periodic inquiry messages to the call manager to verify the continued existence of the call manager. If for any reason the call is interrupted and the call manager is terminated, the port objects and the fabric controller objects will take action to terminate the call connections. The stable call audits are indicated in block 528 of FIG. 4. When the call is terminated by either the calling or called party going on-hook, the corresponding port object will receive an on-hook indication from the associated switching module and send a disconnect message (Table A, message 21, 22) to the call manager 250 indicating termination of the call, as depicted in block 530 of FIG. 4. The call manager will react to the first such message whether from the terminating or originating port object and initiate the call tear-down process. A second on-hook message from the other port object is simply ignored if the tear-down process has already been started. The call manager 250 sends disconnect messages (Table A, messages 23–30) to fabric controller objects 231 (FC1000) and 235 (FC2000), to port objects 215 (A123) and 225 (A456), to line objects 212 (123) and 222 (456) and to subscriber objects 210 (S100) and 220 ($400). This is indicated in block 532 of FIG. 4.

The fabric controller objects 231 and 233 each respond to the disconnect message from the call manager by sending a disconnect message (Table A, message 31, 32) to the bridge controller 260 (BC5000), as indicated in block 533, and by stopping any further stable call audits and releasing the established path through the associated networks in a well-known fashion. The bridge controller likewise causes the path for this call in bridge network 115 to be released. The port objects also stop the audits and adjust their internal data to reflect termination of a call. The line objects respond to the disconnect message by changing internal data to reflect termination of a call as do the subscriber objects, which additionally respond to the disconnect message by terminating the billing period. After transmitting the disconnect messages, the call manager object 250 will self-destruct by causing the runtime system to remove its name from the system and to release the memory reserved for the call.

In the decision block 514 of FIG. 3, a test is made by the terminating port object to determine whether a port is available for connection. In the event that it is not, an unavailability message is sent from the terminating port object 225 to the call manager 250, as indicated in block 540 of FIG. 5. Thereafter, a request message is sent from the call manager to the terminating subscriber object 220 as indicated in block 542. Since the subscriber object contains details of the subscriber service options, the request message from the call manager to the subscriber object is equivalent to a request for further instructions. In this example, a test is made by the subscriber object, as indicated in block 546, to determine whether call forwarding has been defined. If so, the call forwarding number, is sent to the call managers as indicated in block 547 and the call manager will broadcast an incoming call message with the call forwarding number, as indicated in block 510 of FIG. 3. Thereafter, the call will be treated in the same manner as a completed call described above. In the event that the test in block 546 indicates that there is to be no call forwarding, a reject message is sent to the call manager as indicated in block 548. The call manager will provide a message to the originating port 215 to apply busy tone to the subscriber terminal. Thereafter, the system waits for an on-hook as indicated in block 552 and when an on-hook is detected an on-hook message is sent from the originating port object 215 to the call manager 250 as indicated in block 553. Thereafter, the call manager will send termination messages to the originating port object, the originating line object and the originating subscriber object as indicated in block 544. Finally, the call manager object 250 will self-destruct by causing the runtime system to remove its name from the system and to release the memory reserved for the call. The messages used in block 540 through 556 are not shown in detail since these messages are analogous to the exemplary messages of Table A.

Figure 4:
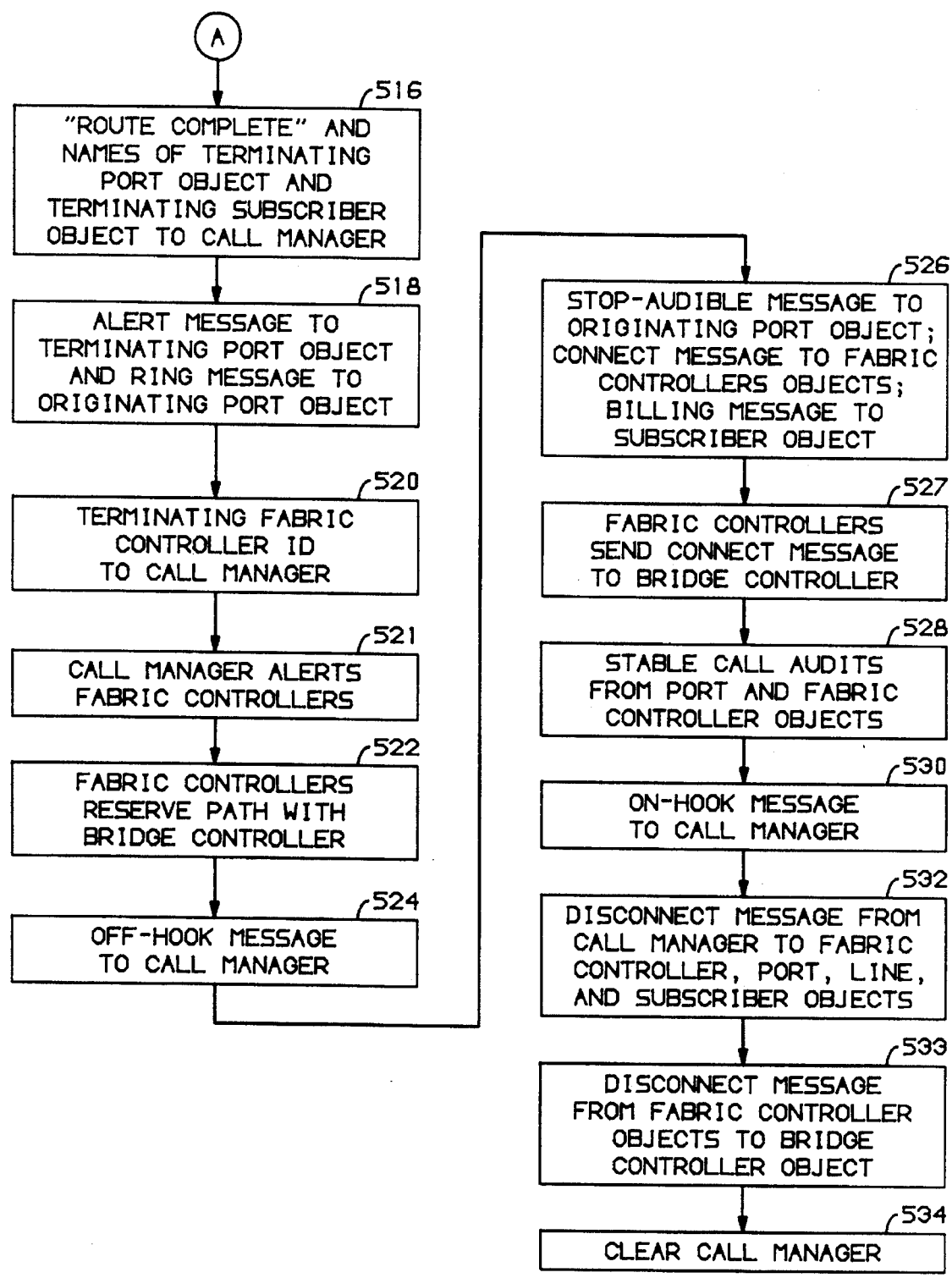
Figure 5:
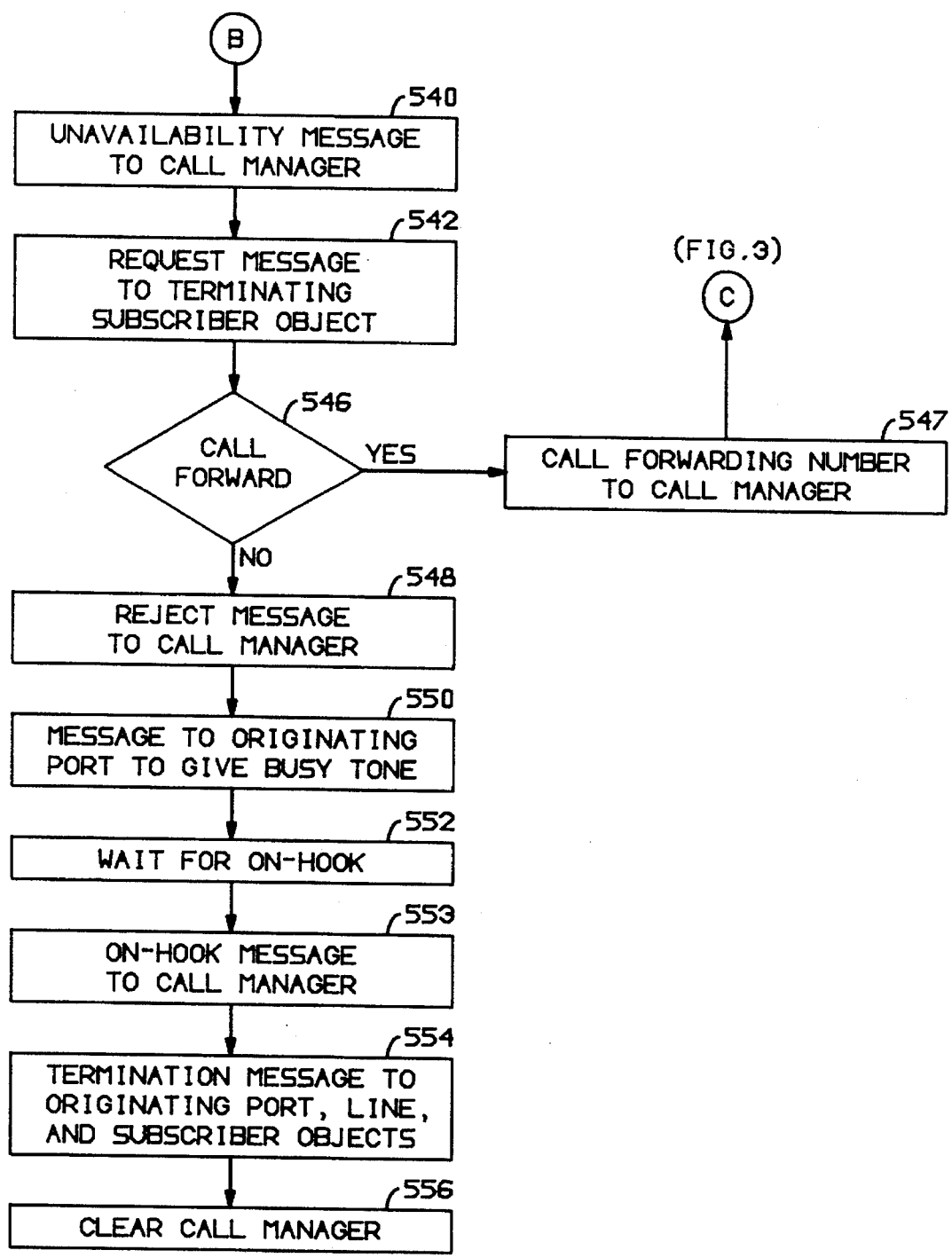
Figure 6:
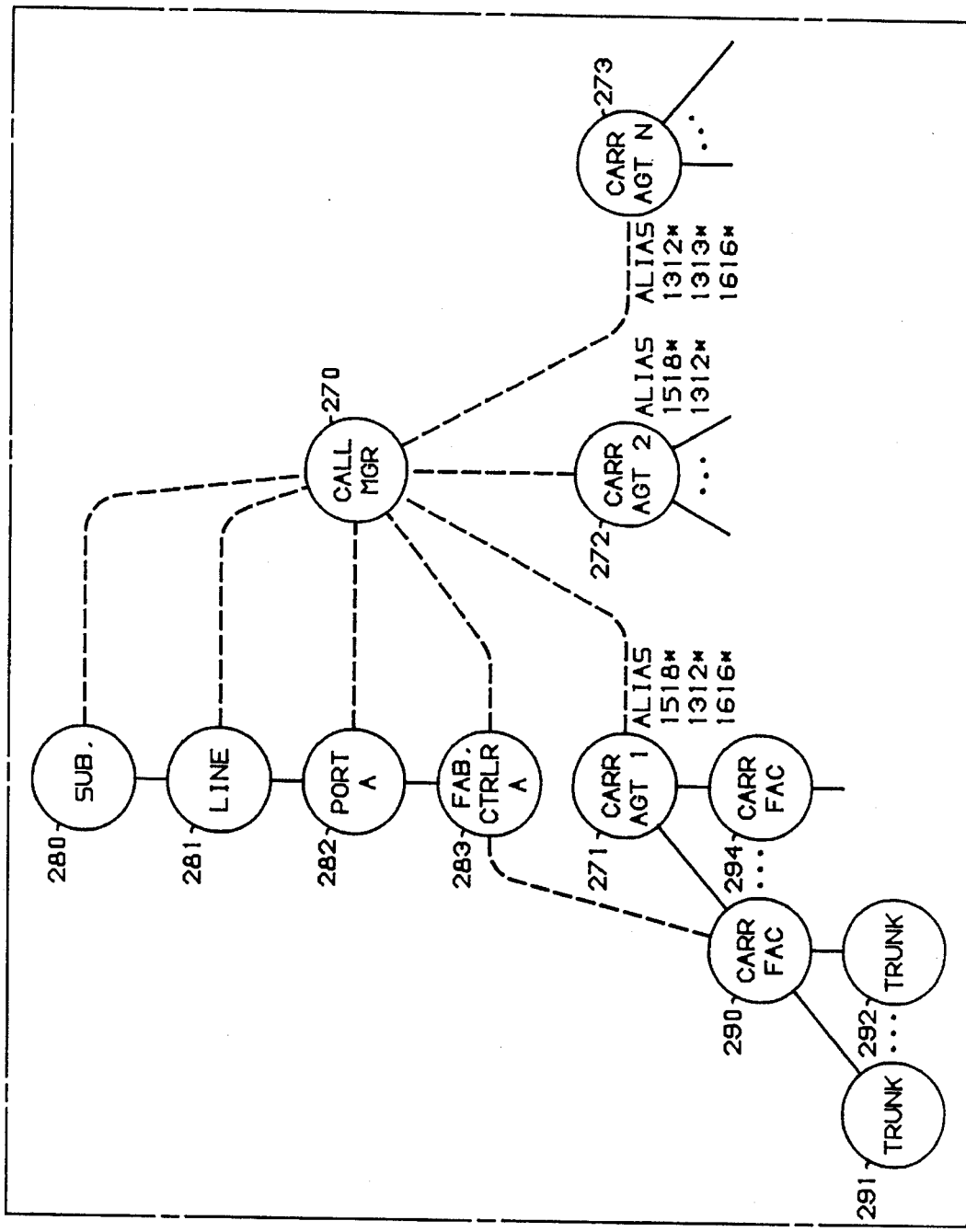

What has been described in the previous paragraphs with respect to FIGS. 3 through 5 is a local call, that is, a call to another subscriber number within the same system, but on a different switching module. In the case of a call to another switching system within what is known as a Local Access Transport Area (LATA), an object known as a tandem agent (not shown in the drawings) analyzes the called directory number broadcast by the call manager and transmits the number to the identified system within the same LATA via one of the trunks 112. In such a case, the call is handled in the destination switching system in a manner analogous to that described above for local calls, with reference to FIGS. 3 through 5. Calls outside of the LATA, that is calls preceded by an area code, e.g. 1–312, require a long distance carrier. Shown in FIG. 6 are a plurality of carrier agent objects 271, 272 and 273, carrier facility controller objects 290, 294, trunk controller objects 291, 292, a call manager object 270, subscriber, line and port objects 280, 281, 282 and fabric controller object 283. The different carrier agent objects represent different long distance carriers such as AT&T, MCI, Sprint etc.. When a call origination is detected in this exemplary switching system, a call manager object created, e.g. call manager object 270, and the called number dialed by the calling subscriber are transmitted to the call manager object. As described above with respect to FIG. 3, the call manager object broadcasts the number as an alias name. If the originated call is a long distance call, the number will include the area code. Since the area code is part of the broadcast name, only carrier agent objects will respond. In accordance with our invention, the carrier agents 271, 272, 273 are assigned alias names or name patterns representing partial names (e.g. 1–518*) corresponding to all of the area codes which can be served by the carrier agent. The runtime system, described in further detail later herein, has the capability for pattern matching which allows all messages with the defined alias name pattern (e.g. 1–518) to be delivered to all objects having that pattern as an alias name.

When the call manager broadcasts a message with an alias name which includes an area code, it is forwarded by the runtime system to all carrier agent objects. Thus, in case the number broadcast includes, for example, the area code 1–312, the runtime system will recognize that this includes the alias name pattern for carrier agents 271 and 272 (FIG. 6) and will transmit the broadcast message to both of these objects. The objects contain information defining busy idle states of their trunk circuits and therefore can determine whether they have facilities available to handle the broadcast call. Assuming that two of the carrier agent objects 271 and 272 have the capability to handle the long distance call, both will transmit an acceptance message to the call manager 270. The call manager in turn will relay the message to the subscriber object 280. The subscriber object may then choose in accordance with a predefined algorithm which of the carriers to select. Alternatively, the subscriber object may request the call manager to present the identity of the available carriers to the subscriber if that the subscriber has terminal facilities equipped for presentation of such information. In that event, the call manager 250 will transmit a message to the port object 215 which will cause the information to be presented to the customer audibly or displayed, in a well-known manner as is commonly done, for example, with ISDN terminals. The subscriber object returns to the call manager information defining a selected long distance carrier.

Figure 7:
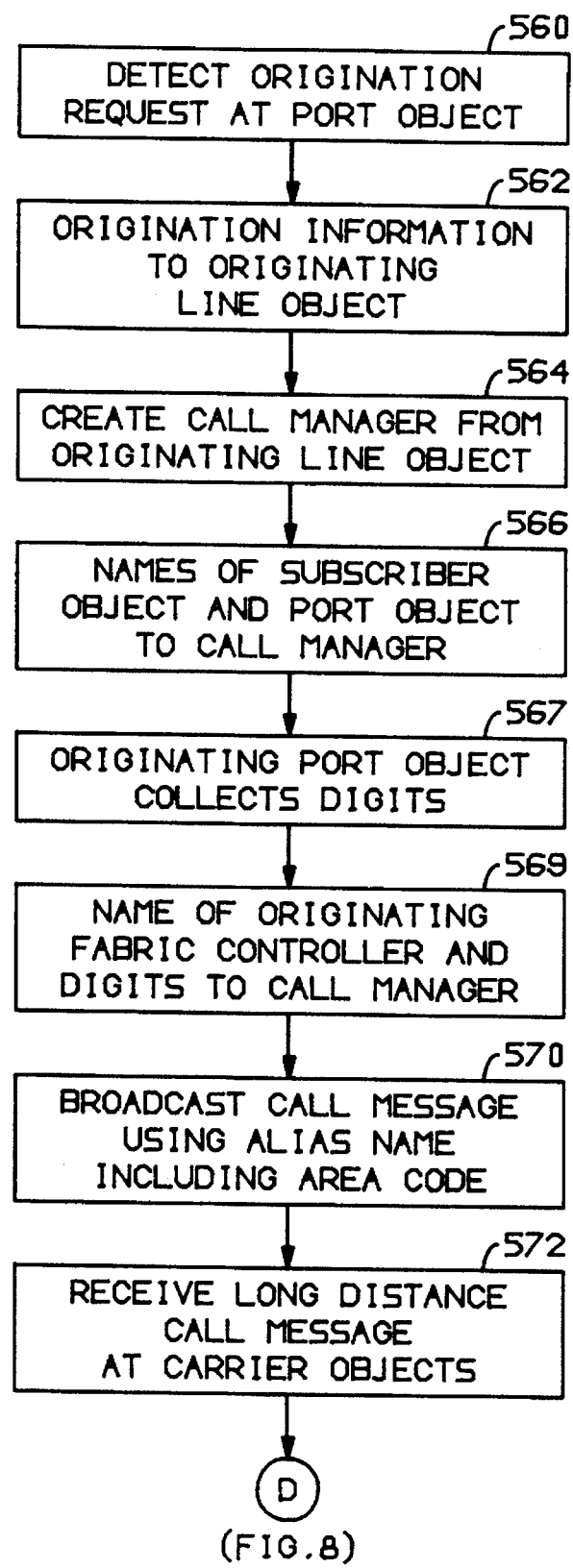
Figure 8:
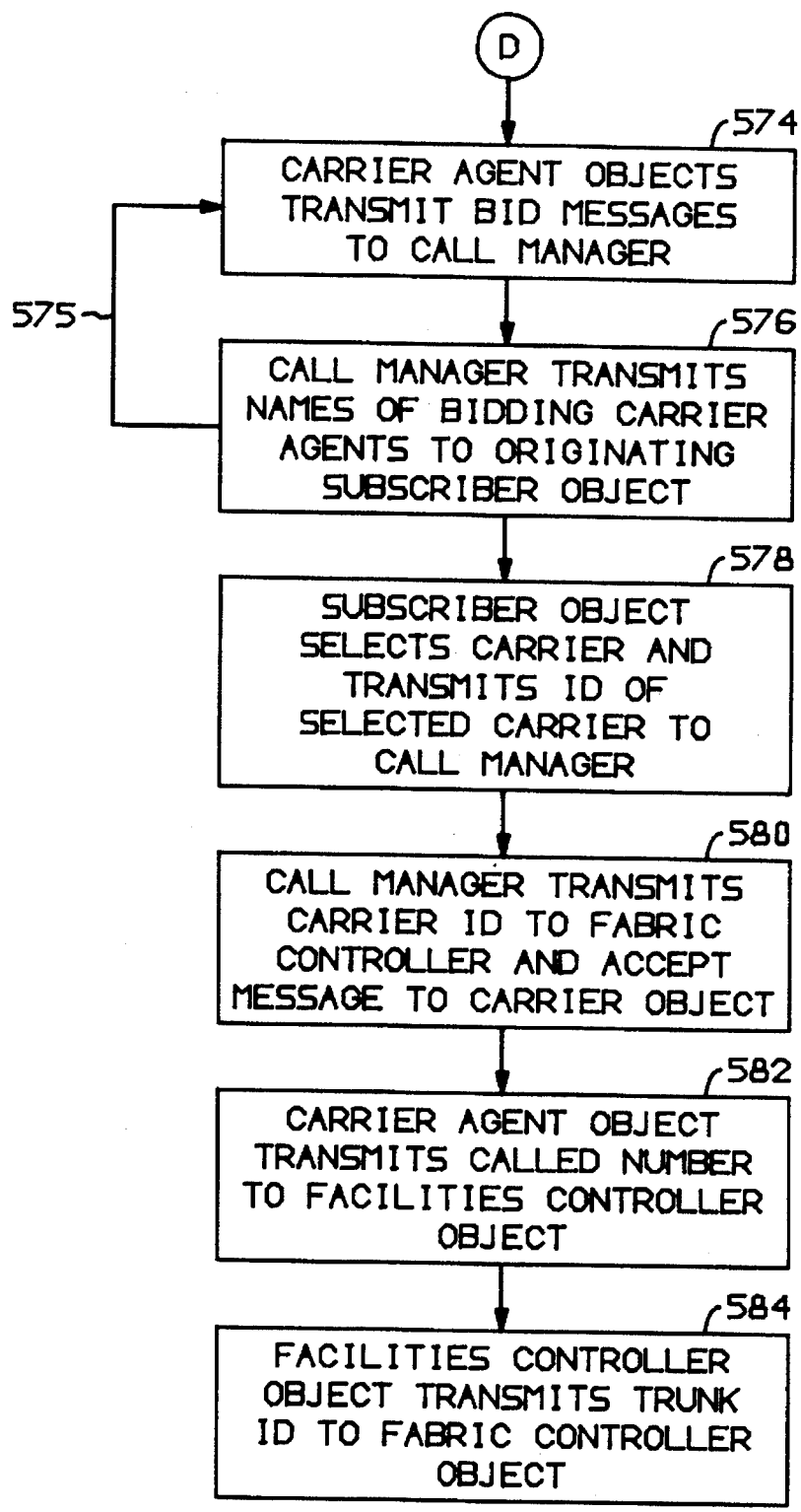

FIGS. 7 and 8 represent the actions of the system in establishing a long distance call in flow chart form. When a long distance call is originated from a subscriber connected to one of the lines 110 of, for example, switch module 130 the origination is detected in the switch module and corresponding information is transmitted to the associated port object of the application software in one of the call handling processors 101, as described previously with respect to FIG. 3 and as reflected in block 560 of FIG. 7. The port object may for example be port object 282 which is associated with line object 281 and subscriber object 280. As described earlier with respect to the local call, the port object transmits the origination information to the originating line object 281 via the runtime system by means of an interobject message. This action is reflected in block 562 of FIG. 7. In response, the line object 281 creates a call manager as reflected in block 564, by means of a message to the runtime system. The call manager may be, for example, call manager 270 which is established only of the purposes for this call. The line object 281 will also transmit to the call manager the identity of the port object 282 and the associated subscriber object 280, as reflected in block 566 of FIG. 6. The details of the messages are not shown since they are analogous to the messages of Table A which were described in detail with respect to FIGS. 3 through 5. As shown in block 568, the originating port object receives information defining digits dialed by the subscriber defining, in this example, an outgoing long distance call. Thereafter, the port object 282 transmits a message to the call manager 270 defining the name of its associated fabric controller and information defining the collected digits, as reflected in block 569 of FIG. 7. The call manager 270 transmits a broadcast message, which like all other interobject messages is handled by the runtime system. The broadcast message, since it is a long distance call will include an area code. For example, the number may be 1-518-555-3000, which will be used as the alias name for the broadcast message. Accordingly, the runtime system associated with the carrier agents 271 and 272 will recognize the 1-518 part as the alias names for the carrier agent objects 271 and 272 and transmit these messages to these objects. As mentioned earlier, these objects may be distributed over a number of call handling processors 101, but that does not affect the structure or operation of the call manager 270 nor the form or content of the message. It will be recognized by those skilled in the art that in accordance with an application software structure according to this invention, a number of long distance carriers may be added or subtracted from the system without in anyway affecting the behavior of the other objects such as the call manager or its client objects such as the fabric controller 283, the port object 282, the line object 281 or the subscriber object 280 shown in FIG. 7. To add a new carrier agent object to the system, the only change that has to be made to the system besides the loading of the carrier object software and its related software such as facility controllers and trunk objects which communicate with the switch module processor which is physically associated with the trunking facilities, is to add the identity of the new carrier agent object and its alias names to the runtime system of the one of the call handling processors 101 in which the new carrier object is located and add the names of the associated facility and trunk objects to the runtime system of the call handling processor on which those particular objects are located.

Block 572 of FIG. 7 reflects the fact that the carrier agent objects, for example 271 and 272, receive the outgoing call message in this example since the dialed number includes the area code 1-518 and these carrier agent objects each have the alias 1-518, as depicted in FIG. 6. There may of course be several carrier agent objects with the same alias. The message received by the carrier agent objects 271 and 272 is in the same format as that shown in Table A and includes the name of the sending call manager. The carrier agent objects respond by transmitting to the call manager 270 a bid message which indicates that they have facilities available for handling the outgoing call. If one or more of the carriers has all of its facilities occupied, it will not respond with any message. Carrier agent objects which are prepared to handle the call transmit a bid messages to the call manager and the call manager 270 transmits names of the bidding carrier agents to the originating subscriber object 280. If no bidding message is received from any of the carrier agent objects, the call manager 270 will time out and send a message to that affect to the subscriber object 280. Options, other than timing out, such as attempting to complete the call on a private network, may be provided. The subscriber object includes call handling options defined by the subscriber and will instruct the call manager accordingly. When the call manager receives a first bid message from a carrier agent as indicated in blocks 574, it transmits the name of the bidding agent to the subscriber object 280 as indicated in block 576 of FIG. 8. As other bids are received by the call manager 270, they are transmitted to the subscriber object 280 which is reflected by the looping indicated at 575 in FIG. 8. The information provided by the subscriber to the subscriber object may include information defining the length of time the subscriber wishes to wait for bids from carrier agents before selecting an agent for the particular call. For example, subscriber may define that all calls should go by means of a first carrier agent unless no such carrier agent is available within a specified period of time and thereafter a call should go to a second carrier agent if available or, if not, then to any carrier agent that is available. Various selection algorithms for selecting, for example corporate or commercial networks for outgoing calls are known in the art. In block 578 of FIG. 8 is indicated the action by the subscriber object in selecting a carrier and transmitting the identity of the selected carrier to the call manager. The call manager transmits the carrier identity to fabric controller 283 and transmits a message to the selected carrier object indicating acceptance. In this example, the originating subscriber line is connected to the switch module 130 as are the trunks for the selected carrier agent, which in this example is carrier agent 1 represented by carrier agent object 271. After receiving the acceptance message, the carrier agent object 271 transmits the called number information to the facilities controller associated with the available trunk to be used in the call. The carrier agent object 271 has a number of associated physical trunk facilities and for each trunk facility there is a trunk object dedicated to the physical trunk in a manner analogous to the relationship between port objects and physical lines. Associated with the carder agent object are carrier facility objects 291, 294. Each carrier facility object may have associated with it more than one trunk. To establish a call, the carrier agent object 271 sends the relevant information to the facilities controller object 290 as indicated in the block 582 of FIG. 8. The facilities controller selects an available trunk and transmits the trunk identity to the fabric controller object 283. The fabric controller object generates the necessary information to establish a connection through the switching network 132 between the identified one of the subscriber lines 110 and the identified one of the trunks 112. In this example, only one fabric controller is involved since both the originating line and the outgoing trunk are connected to the same switching network. If that is not the case, a connection will have to be established between the switching networks via the bridging network 115 and will involve a bridge controller object as described earlier with respect to FIGS. 3 through 5.

Figure 9:
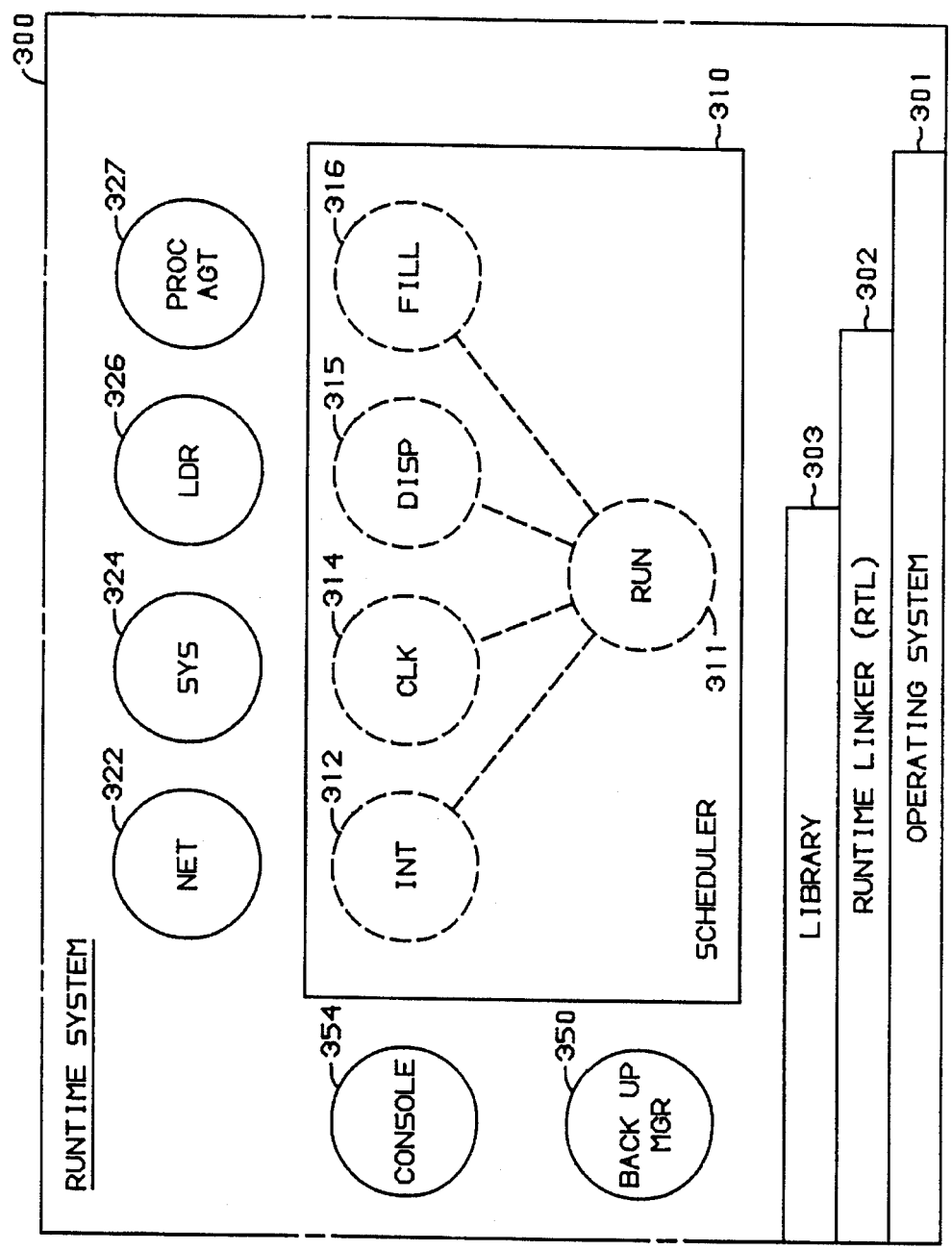
FIG. 9 is a pictorial representation of runtime system software for use in the system of FIG. 1.

FIG. 9 is a diagrammatic representation of the runtime system for the processors 101. Separate runtime system software is provided in each of the processors. In each processor, the runtime system provides the mechanism for communication between objects. The runtime system 300 comprises an operating system 301, which may be the commercially available LISP operating system called GENERA, marketed by Symbolics, Inc. Various versions of LISP are in existence. In one prototype system in accordance with this invention, a version of LISP called "FLAVORS" is used. It is described in the Flavors, Reference Guide to Symbolics-Lisp, Symbolics, Inc., 1985. The operating system 301 may be thought of as forming the base layer 301 of the runtime system 300. An interface layer to the base layer, is the runtime linker 302. The runtime linker is unique to the present system and provides the mechanism for communicating between objects without the need for knowledge on the part of the sending object of locations or addresses of the receiving objects. This linker makes possible a loosely coupled highly modular software structure in which new objects may be added to or removed from the system without disturbing other objects existing in the system. In this arrangement, objects are given symbolic names known to all other objects of the system and communication between objects is by means of messages including symbolic names resolved by the runtime linker. The runtime linker includes a linker table (FIG. 18) which has an entry including a data address pointer for all of the objects on the processor in which the linker resides. The runtime linker uses the data pointer in the "FLAVORS" version of LISP to make a function call to the object identified by the symbolic name. An interobject message includes a method designation (see Table A for exemplary messages) which represents a genetic function of LISP. The runtime linker uses the standard LISP apply function to call the genetic LISP function defined in the interobject message (see Table A for exemplary messages) and passes the data pointer from the linker table together with the argument list of the message to the genetic function. The genetic function addresses the data of the called object at the data pointer and the function is executed in LISP using parameters defined by the object data. An entry of the linker table (FIG. 18) defines either another object name or a data pointer. If the entry is an object name, the runtime linker iteratively looks up that object name until it finds a data pointer.

Also shown in FIG. 9 are library functions 303 which are called by the runtime system. The use of library functions to perform specific operations is well known. In this illustrative system, the library functions include a function referred to as the POST function. It is used in communications between objects of the application program, as described later herein with respect to FIG. 11. The runtime system 300 includes a scheduler object 310 which allocates computer machine time to those objects of the runtime system and of the application program which are registered in the linker table (FIG. 18). The scheduler may be a single object, but is represented by a number of different object names to simplify communications. It includes the RUN object 311 which processes interrupt functions represented by INT 312, timing functions represented by CLK 314, dispatch functions represented by DISP 315 and fill functions represented by FILL 316. These functions are processed by the scheduler object in accordance with a predefined priority algorithm described below with respect to FIG. 10. As interrupt messages are received by one of the call handling processors 101, for example from an input terminal, they are entered in an interrupt queue and eventually handled by the scheduler 310 for that processor. Similarly, time out requests are entered in a clock queue and dispatch requests received, for example, in connection with the transmission of messages between objects are entered into a dispatch queue, for processing by the scheduler 310. A fill queue registers lower-level tasks to be performed, such as maintenance tasks.

Figure 10:
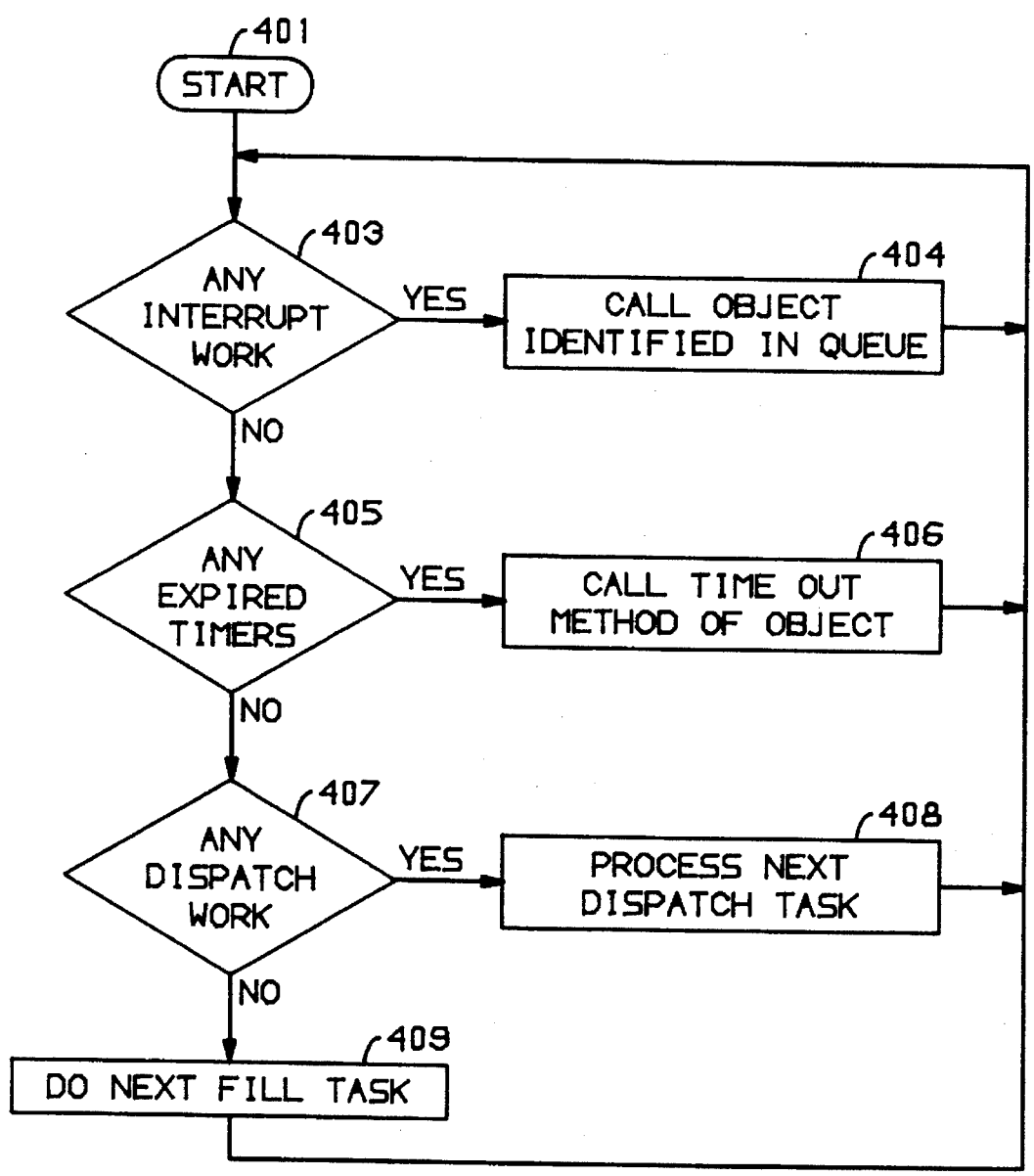
FIGS. 10 through 12 are flow chart representations of sequences of actions of the runtime system of FIG. 9.
Figure 13:
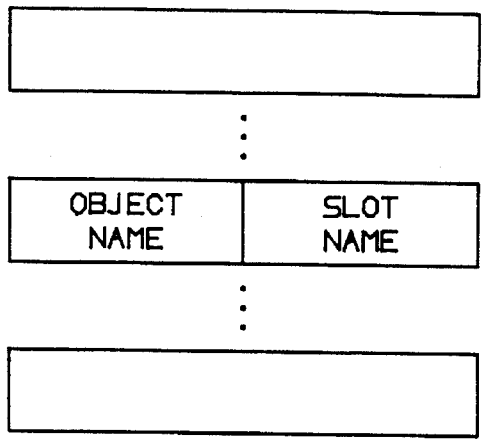

FIG. 10 is a flow chart representation of the execution of the RUN method 311 of the scheduler object 310. When the RUN method starts, as depicted in block 401, its first task is to determine whether there is any interrupt work on the interrupt queue (FIG. 13) as indicated in decision block 403. If so, the next listed interrupted task will be processed as indicated in block 404 and a return is made to block 403 to look for more interrupt work. For the sake of simplicity, different levels of interrupt priority are not considered, but could be readily implemented by, for example, adding a queue for each level and first executing tasks from the highest level queue. Each object existing on a processor 101 which receives interrupt signals is registered in the scheduler 310 of that processor by assignment of unique slots in the interrupt queue corresponding to identified interrupt sources. That information is used to route interrupt signals to the objects. When an interrupt message is received for a specified object, it is entered in the interrupt queue in the slot for which the receiving object has been registered. Processing an interrupt task in block 404, includes a transfer to the interrupt method of the registered object for further action.

Figure 14:
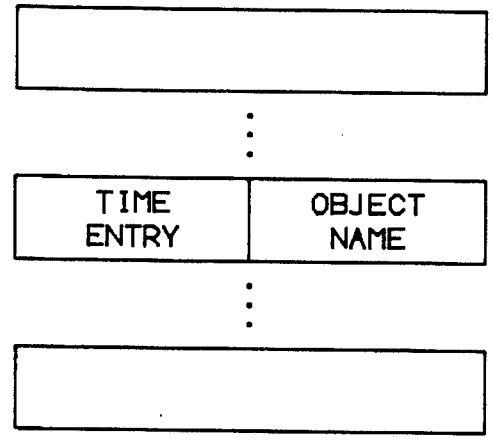
Figure 15:
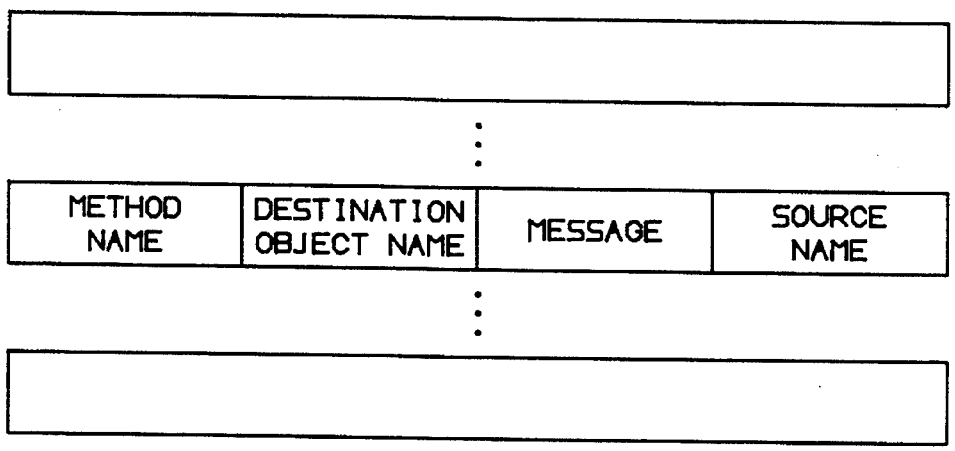

When the test in block 403 indicates that there is no further interrupt work to be done, an advance is made to decision block 405 where a test is made to determine if there are any expired timers. Any process wishing to be alerted upon the expiration of a specific period of time, transmits a message to the CLK object 314, defining a requested time period. The scheduler enters the object name extracted from the message and a time value derived, for example, by adding the desired time period to the current clock time, in the clock queue (FIG. 14) in the order of their time-out time values. When the test is made in block 405, the time value entries in the clock queue are compared with the then current time to determine whether the desired time period has expired. When one of the timers has timed out, it is processed as indicated in block 406 by sending a message via the runtime linker to the time-out method of the requesting object. In response, the requesting object may send a message to itself via POST which will cause the message to be entered in the dispatch queue 315 in FIG. 9. This procedure allows the time-out message to be handled by the requesting object in sequence, after handling other messages for that object which may already be in the dispatch queue. Alternatively, the object may act immediately on the time-out call. Upon completion of a time-out task in block 406 of FIG. 10, a return is made to decision block 403 to determine if any other interrupt work needs to be done. If not, another test will be made to determine if any further timer work needs to be done in block 405. If no further timing work is to be done, an advance is made to decision block 407 to test whether there is any work on the dispatch queue 315. The dispatch queue is a list of object names which may have been placed there as a result of a message from an object to the scheduler 310 or as the result of an interobject message. The information entered in this queue includes message information the names of the source and destination objects, as shown in FIG. 15. In processing a dispatch task, as indicated in block 408 of FIG. 10, a transfer is made via the runtime linker 302 to the identified object and the message data is passed as an argument list. Upon completion of a dispatch task, a return again is made to decision block 403 and the steps recited above with respect to blocks 403, 405 and 407 are repeated. If no further dispatch work is to be done a fill task is executed and a test is again made whether there is any interrupt timer work or dispatch work before a next fill task is executed.

Figure 11:
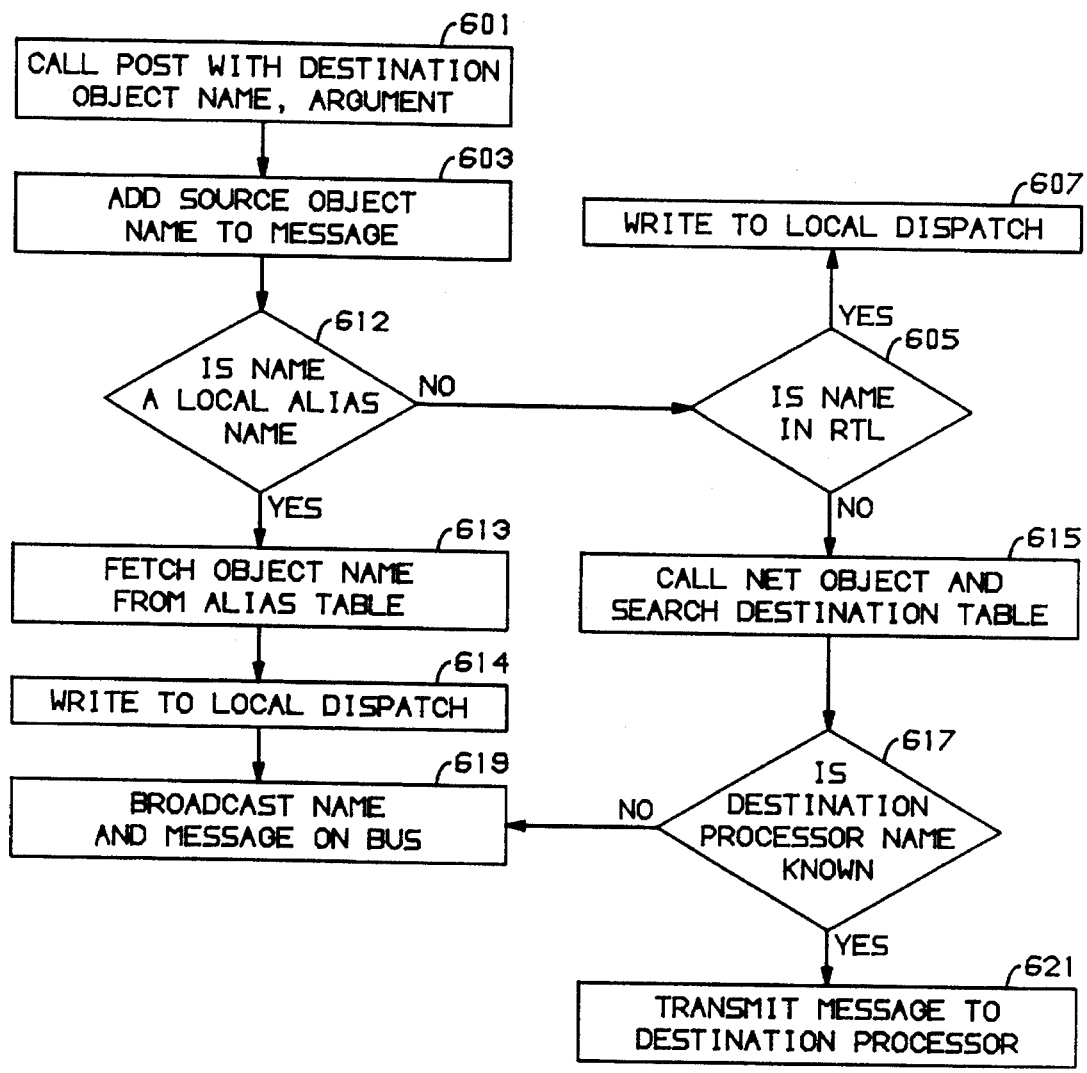

FIG. 11 is a flow chart representation of the transfer of an executable expression, also referred to as a message, between objects as discussed, for example with respect to FIG. 2. The objects of the application software communicate directly only with the runtime system of the processor on which they reside and none of the application software objects knows the address or location of other objects. Other objects are addressed only by their symbolic names. The message transmission sequence begins with a call to POST which is one function in the library 303 shown in FIG. 9. The message will include the name of the destination object and a designation of the method of the destination object, as well as an argument (e.g. data) to be transmitted, as reflected in block 601 of FIG. 11. POST adds the name of the originating object to the message as shown block 603. Exemplary messages are shown in Table A. A test is made in block 612 to determine whether the name is a local alias name, by examination of the alias table of FIG. 17. This table contains all alias names registered by objects of the local processor. Several objects may register for the same alias name. If the tested name is not listed in the alias table, the POST function calls the runtime linker 302 and a test is made in block 605 to determine whether the name of the destination object is in the linker table (FIG. 18). If an object name is found, indicating that the object resides on the local processor, the message is written to the dispatcher 315 of the local runtime system 300 of FIG. 9, as shown in block 607 and entered on the dispatch queue (FIG. 15). The scheduler 310, in executing the sequences described with respect to FIG. 10, will invoke the destination object via the runtime linker 302. This invocation may well result in the transmission of another message from the executing object by calling the POST function, as discussed with respect to block 601.

If the test in block 605 indicates that the name is not in the linker table, the NET object 322 is called. The NET object provides an interface with the bus 103, both to receive data from the bus and to transmit data on the bus to other processors. When the NET object receives the message from POST, it will perform a search of its destination table as reflected in block 615. An entry for this table, which is generated by the NET object on an ongoing basis, is shown in FIG. 16. Each time the NET object receives a message from an object on another of the processors in the system, it records the name of that object together with the identity of the source processor. In the search performed in block 615 the NET object may determine from this table that the processor on which the destination object resides is known. This test is reflected in block 617. If it is known, the NET object will transmit the message to the destination processor using its known identification, as reflected in block 621. In the event that the object name is not found in the destination table in the test in block 617, indicating that the processor on which the destination object resides is not known to the NET object at the sending processor, an advance is made to block 619 and the object name is broadcast on bus 103 together with the message. If the test in block 612 indicates that the name is a local alias name, the corresponding object name or names are fetched from the alias table as indicated in block 613 and the message is written to the local dispatch object 315 for each of the objects identified in the alias table entry as indicated in block 614. Thereafter, the alias name message is broadcast to all other processors, as indicated in block 619.

Figure 12:
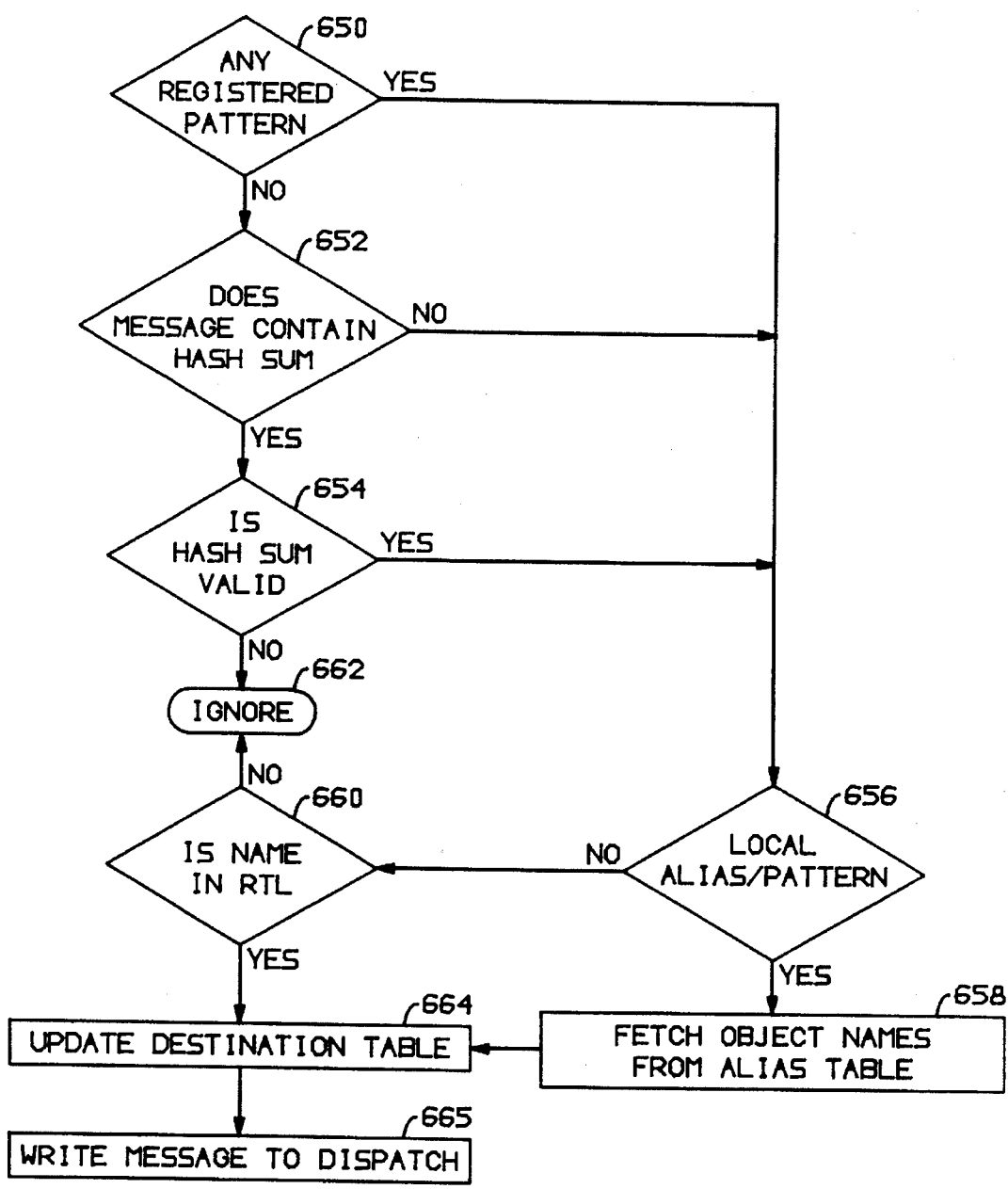

In each of the processors 101, the NET object shown at 322 in FIG. 9, examines all incoming messages, including broadcast messages. FIG. 12 indicates several tests that are done on incoming messages. The first test as indicated in FIG. 12, block 650 which is a test to determine whether there are any registered patterns that the NET object needs to be looking for. The alias table of FIG. 17 registers any patterns for the local processor. A pattern in this system is defined as a string of characters which represent a portion of a number of different names. Any object requesting a pattern match, will have its pattern registered in the alias table. Any pattern may be registered for several different objects. By way of example, if the registered patent pattern is 555, all objects registered for that pattern would receive a message for example which is broadcast under the alias name 555-3000 and any other messages containing the 555 pattern. If it is determined in block 650 of FIG. 12 that this machine does not have any register patterns, a test is made to determine whether the message contains a hash sum as reflected in block 652. Hash sum of the name of the destination object is generated by the transmitting processor in accordance with a standard and well-known hashing algorithm. The NET object maintains a table (not shown in the drawing) containing the hash sum for all local linker table names and alias names. The hash sum is included separately in a field of the message and may be more readily checked for a match than an arbitrary string of characters. If such a hash sum is present, a further test is made in block 654 to determine if this is a valid hash sum for this processor if not, it may be ignored as indicated at 662 in FIG. 12. If the test in block 650 indicates that there are registered patterns on the local processor, the hash sum check is bypassed and a further test is made to determine whether the name of the message is in the alias table of FIG. 17. If the name is an alias name or pattern recorded in the alias table, the corresponding object names are obtained from the table as indicated in block 658. The message is then written to the dispatch object 315 (FIG. 9). The message will then be delivered to each of the identified objects by the runtime system. One of the functions performed by the NET object is to update the destination table as indicated in block 664. The destination table is shown in FIG. 16 and has been referenced before. The table is used to keep track of the identity of the processor on which a sending object resides. As mentioned earlier, this table is used in the transmission of messages to a destination object. If the name of the destination object is in the destination table, the message can be addressed directly to the corresponding processor. If the name is not in the table the message will be broadcast, which is a more time consuming procedure. If the name is an alias or a pattern, the name of the sending object is extracted from the received message and is entered with the identity of the source processor in the destination table.

In the event that the test in block 652 indicates that the message does not contain a hash sum, an advance is made to block 656 to determine whether it is a local or pattern name as described above. If the test in block 652 indicates that the message does contain a hash sum, a further test is made in block 654 to determine if this is a valid hash sum for the local processor. If not, then it is ignored since it refers to a name which is not registered for this particular machine. If it is a valid hash sum, an advance is again made to block 656 since the name may also be an alias or pattern name. If the destination object name is not an alias or a pattern, a further test is made to determine if this name is registered with the runtime linker and included in the linker table shown at FIG. 18. If it is not in the runtime linker, the message is again ignored as indicated at 662. However, if the object name is in the linker table, the message is written to the dispatch component 315 (FIG. 9), as indicated in block 665. Furthermore, the destination table is updated with the name of the sending object and of source processor obtained from the received message, as indicated in block 664.

Figure 19:
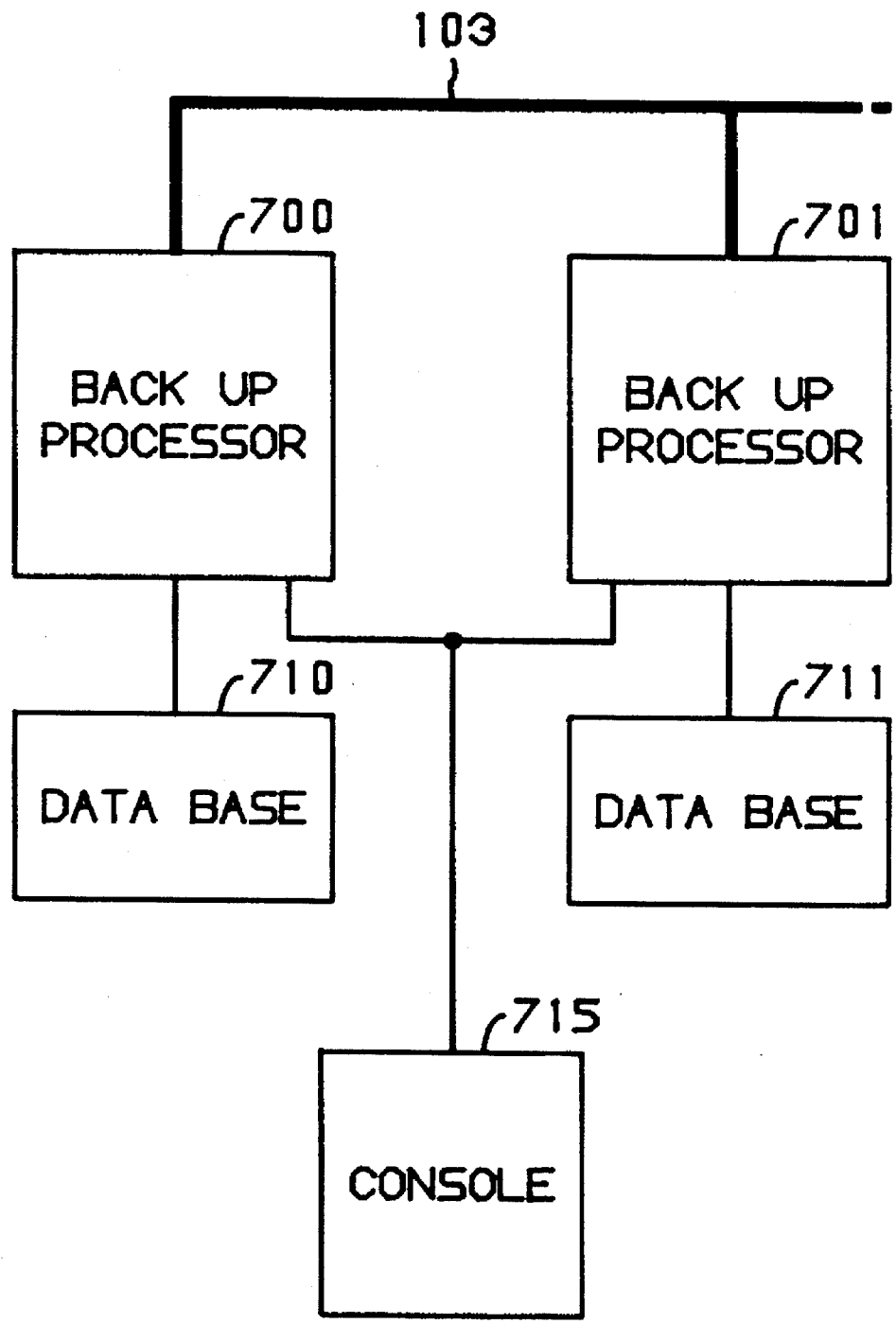
FIG. 19 is a representation of a backup arrangement for the system of FIG. 1.

To enhance reliability of the overall system, a backup system is provided. One of the processors of the system of FIG. 1 may be designated as a backup processor and be provided with a backup file system or a separate processor may be added. Furthermore, the backup processor and file system may be duplicated to assure greater system reliability. The backup configuration is depicted in FIG. 19 as an adjunct to the system of FIG. 1. It comprises duplicated backup processors 700 and 701 each having their own file systems 710 and 711, respectively, connected to a console 715. Each of the backup processors has a backup manager object 350 and a console object 354, shown in FIG. 9. The backup system maintains a non-volatile copy of all backup images transmitted to it by other objects of the system. These images are cataloged in the file system 710, 711 under the name of the client object from which the information is received. The images are retrievable by a request to the backup manager identifying the specific client objects. Backup images will be created for each of the static objects of the switching office, which define the basic office configuration. Backup images for dynamic objects, which exist only for the duration of a call or the like, may not be necessary. In the event of a processor failure, the only surviving representation of the processor objects residing on the failed processor is in the backup images in the file systems 710, 711. A group of objects residing on the failed processor may be reinstated on the same host or on a different physically compatible host. Each of the processors 101 (FIG. 1) in the system has the capability of being bootstrapped up to an object known as the initialization agent. To recover the software system of a failed processor on the same or another processor, the designated processor is bootstrapped to activate the initialization agent. A message is sent from maintenance console 515 (FIG. 19) via console object 354 (FIG. 9) to the initialization agent object of the designated processor, which causes the initialization agent object to assume the role of the processor agent object 327 (FIG. 9) of the out of service object group. Typically each of the processors 101 has a group of objects and a processor agent object 327 which transmits backup images to the backup system and recovers backup information from the backup system. In response to the message from a maintenance console 515 which defines the processor agent for the group of objects to be recovered, the designated processor agent requests its own backup image objects from the backup manager 723 in backup processors 500, 501. The backup image contains the names of the classes and the names of each of the objects which were in the group at the time of the failure. The processor agent 327, by means of messages to the backup manager object 350, proceeds to download the required class definitions from the backup data base system 510, 511 and to recreate the named objects in the order in which they are identified in the backup image, which is the same order in which they were originally created. The processor agent then sends each component, in turn, a message which will cause it to recover its own backup image by messages to the backup manager 350. In this manner the object group is completely reestablished in the same or a different processor.

By means of heartbeat messages transmitted by each of the processors, and monitored by all the other processors of the system, it is possible to detect the fact that a particular processor is out of service. The host processor which detects this condition of another processor can assume the role of the failed processor by automatically transforming its processor agent into the processor agent of the failed processor and recover the out of service component group. This procedure allows for the automatic conversion of spare hosts which are not doing essential tasks, into working hosts in response to a processor failure.

In a large real time system such as a telecommunication switching system, the changes in office parameters resulting, for example, from the changes in subscriber services, are introduced in a designated area, referred to as the recent change area, on a temporary basis. In the system in accordance with this invention there is no central data area and all office configuration information and the like is included in the structure of the individual objects. Change messages can be entered directly to the appropriate object via the console 515 and console manager 725 and the processor agent 721 associated with the object to be modified. Messages to the various processor agents may include messages which cause new objects to be created within the processor agents object group, moved between object groups or removed from the system. Messages may be sent to individual objects to change their local configuration or to establish or remove static links with other components. Changes made as a result of messages to the processor agents are recorded in the backup system by the processor agents and changes made in response to messages to the individual objects are backed up by the objects themselves.

It is to be understood that the above-described arrangement is merely illustrative of the principles of the invention; numerous other arrangements may be devised by those skilled in the art without departing from the spirit and scope of the invention.

TABLE A

MESSAGES

| Destination Object | Method Name | ARG | Source Object |
| --- | --- | --- | --- |
| 123 | OUTGOING CALL | CHANNEL-NUM | A123 |

Message 1 (Block 502)

| Destination Object | Method Name | ARG | Source Object |
| --- | --- | --- | --- |
| CMA123 | CALL DATA | LO=123<br>SO=S100<br>PO=A123<br>NUM=555-2000<br>CALL STATE<br>CHANNEL-NUM | 123 |

Message 2 (Block 506)

| Destination Object | Method Name | ARG | Source Object |
| --- | --- | --- | --- |
| CMA123 | INFO | DIGITS=XXXX<br>FC=FC1000<br>MSG TYPE<br>CHANNEL-NUM | A123 |

Message 3 (Block 509)

| Destination Object | Method Name | ARG | Source Object |
| --- | --- | --- | --- |
| 555-3000 | INCOMING CALL | TO LINE FROM LINE | CMA123 |

Message 4 (Block 510)

| Destination Object | Method Name | ARG | Source Object |
| --- | --- | --- | --- |
| CMA123 | ROUTING COMPLETE | PO=A456<br>SO=S400 | 456 |

Message 5 (Block 516)

| Destination Object | Method Name | ARG | Source Object |
| --- | --- | --- | --- |
| A456 | ALERTING | TONE TYPE | CMA123 |

Message 6 (Block 518)

| Destination Object | Method Name | ARG | Source Object |
| --- | --- | --- | --- |
| A123 | ALERTING | TONE TYPE | CMA123 |

Message 7 (Block 518)

| Destination Object | Method Name | ARG | Source Object |
| --- | --- | --- | --- |
| CMA123 | CALLED CHANNEL INFO | CHANNEL-NUM<br>FC=FC2000 | A456 |

Message 8 (Block 520)

| Destination Object | Method Name | ARG | Source Object |
| --- | --- | --- | --- |
| FC1000 | GET PATH | PO=A123<br>BC=BC5000<br>CALL REF | CMA123 |

Message 9 (Block 521)

| Destination Object | Method Name | ARG | Source Object |
| --- | --- | --- | --- |
| FC2000 | GET PATH | PO=A456<br>BC=BC5000<br>CALL REF | CMA123 |

Message 10 (Block 521)

TABLE A-continued

MESSAGES

| Destination Object | Method Name | ARG | Source Object |
|---|---|---|---|
| BC5000 | LINK | CM=CMA123<br>LINK=X | FC1000 |

Message 11 (Block 522)

| Destination Object | Method Name | ARG | Source Object |
|---|---|---|---|
| BC5000 | LINK | CM=CMA123<br>LINK=Y | FC2000 |

Message 12 (Block 522)

| Destination Object | Method Name | ARG | Source Object |
|---|---|---|---|
| CMA123 | CONNECT | CHANNEL-NUM | A456 |

Message 13 (Block 524)

| Destination Object | Method Name | ARG | Source Object |
|---|---|---|---|
| A123 | ADD TO PATH | CALL REF<br>END POINTS<br>FC=FC1000 | CMA123 |

Message 14 (Block 526)

| Destination Object | Method Name | ARG | Source Object |
|---|---|---|---|
| FC1000 | ANSWER | CHANNEL-NUM | CMA123 |

Message 15 (Block 526)

| Destination Object | Method Name | ARG | Source Object |
|---|---|---|---|
| FC2000 | ANSWER | CHANNEL-NUM | CMA123 |

Message 16 (Block 526)

| Destination Object | Method Name | ARG | Source Object |
|---|---|---|---|
| S100 | CALL CONNECT | 555-2000<br>555-3000<br>CONNECT-TIME | CMA123 |

Message 17 (Block 526)

| Destination Object | Method Name | ARG | Source Object |
|---|---|---|---|
| S200 | CALL CONNECT | 555-2000<br>555-3000<br>CONNECT-TIME | CMA123 |

Message 18 (Block 526)

| Destination Object | Method Name | ARG | Source Object |
|---|---|---|---|
| BC5000 | CONNECT | CMA123 | FC1000 |

Message 19 (Block 528)

| Destination Object | Method Name | ARG | Source Object |
|---|---|---|---|
| BC5000 | CONNECT | CMA123 | FC2000 |

Message 20 (Block 528)

| Destination Object | Method Name | ARG | Source Object |
|---|---|---|---|
| CMA123 | DISCONNECT | | A123 |

Message 21 (Block 530)

| Destination Object | Method Name | ARG | Source Object |
|---|---|---|---|
| CMA123 | DISCONNECT | | A456 |

Message 22 (Block 530)

| Destination Object | Method Name | ARG | Source Object |
|---|---|---|---|
| FC1000 | CALL DISCONNECT | 555-2000<br>555-3000<br>CONNECT-TIME<br>DISCONNECT-TIME | CMA123 |

Message 23 (Block 532)

| Destination Object | Method Name | ARG | Source Object |
|---|---|---|---|
| FC2000 | CALL DISCONNECT | 555-2000<br>555-3000<br>CONNECT-TIME<br>DISCONNECT-TIME | CMA123 |

Message 24 (Block 532)

| Destination Object | Method Name | ARG | Source Object |
|---|---|---|---|
| A123 | OTHER-DISCONNECT | | CMA123 |

Message 25 (Block 532)

| Destination Object | Method Name | ARG | Source Object |
|---|---|---|---|
| A456 | OTHER-DISCONNECT | | CMA123 |

Message 26 (Block 532)

| Destination Object | Method Name | ARG | Source Object |
|---|---|---|---|
| 123 | OTHER-DISCONNECT | | CMA123 |

Message 27 (Block 532)

| Destination Object | Method Name | ARG | Source Object |
|---|---|---|---|
| 456 | OTHER-DISCONNECT | | CMA123 |

Message 28 (Block 532)

| Destination Object | Method Name | ARG | Source Object |
|---|---|---|---|
| S100 | DISCONNECT | | CMA123 |

Message 29 (Block 532)

| Destination Object | Method Name | ARG | Source Object |
|---|---|---|---|
| S400 | DISCONNECT | | CMA123 |

Message 30 (Block 532)

| Destination Object | Method Name | ARG | Source Object |
|---|---|---|---|
| BC5000 | CALL DISCONNECT | | FC1000 |

Message 31 (Block 533)

| Destination Object | Method Name | ARG | Source Object |
|---|---|---|---|
| BC5000 | CALL DISCONNECT | | FC2000 |

Message 32 (Block 533)

We claim:

1. A computer-implemented method for controlling a telecommunications system by using inter-object message communication, said telecommunication system comprising an operating system, a linker, and a plurality of object means for controlling functionality of said telecommunication system, each of said object means controlling a subset of said functionality and a subset of data, said method comprising:

generating a message in an origination object means, said origination object comprising one of said plurality of object means, said message being divided into parts comprising a symbolic name of a destination object means, said destination object means comprising one of said plurality of object means different from said origination object means, a designation of one or more predefined system operations to be performed on said message by said operating system, and an argument list;

said origination object means causing said operating system to transmit said message from said origination object to said linker, said linker having a linker table comprising a plurality of symbolic names and a corresponding plurality of address pointers for each one of said plurality of object means, said linker comparing said symbolic name in said message to said plurality of symbolic names in said linker table in order to determine one or more address pointers corresponding to said symbolic name; and said linker object controlling said operating system to perform said designated one or more predefined system operations on said message and providing said determined one or more address pointers of a destination object means to said one or more predefined operations, whereby, said telecommunications system is responsive to said system to operations to perform its operations.

2. A method in accordance with claim 1 wherein, after said message is transmitted, said linker comparing said symbolic name in said message to said symbolic names in said linker table; and said linker causing said one or more predefined operations to be performed on said message and providing said address pointer to said one or more predefined operations only if said symbolic name in said message is found in said linker table.

3. A method in accordance with claim 2 wherein said telecommunications system includes a plurality of processors, said method further comprising if said symbolic name in said message is not found in said linker table, transmitting said message to another of said plurality of processors.

4. A method in accordance with claim 3 wherein said linker further comprises a network address table, said network address table including a list of symbolic names and a corresponding processor identified for each symbolic name and wherein the step of transmitting said message to another of said plurality of processors comprises:

comparing said symbolic name in said message to entries of said network address table;

if said symbolic name is found in said network address table, transmitting said message to said corresponding identified processor; and if said symbolic name is not found in said network address table, broadcasting said symbolic name to said plurality of processors.

5. A method in accordance with claim 3 wherein said linker further comprises a table of local alias names, said table comprising a list of local alias names and one or more corresponding local object means, said method further including the step of:

determining if said symbolic name in said message is found in said local alias name table, and if said symbolic name in said message is found in said local alias name table, providing said message to all local object means corresponding to said alias name.

6. A method in accordance with claim 5 further comprising:

if said symbolic name in said message is not found in said local alias name table, broadcasting said symbolic name to said plurality of processors.

7. A telecommunication switching system, said telecommunication switching system comprising a plurality of telecommunication line devices for connecting telecommunication lines and at least one interconnection device for establishing connections between said telecommunication line devices, said system including an object-oriented program-controlled system comprising:

an operating system;

a plurality of object means for controlling functionality of said telecommunications system, each of said object means having at least one symbolic name, each of said plurality of object means being created by said operating system, wherein each of said plurality of objects controls a portion of the functionality of said telecommunications system;

a linker for receiving messages, said linker including a linker table of a plurality of symbolic names and a corresponding plurality of address pointers of destination object means, wherein each newly created object means includes means to add its at least one symbolic name and its address pointer to said linker table, and each object means includes means to remove its at least one symbolic name and its address pointer from said linker table before deleting itself from said plurality of object means, so that interobject communication is not disturbed by said adding and said removing, said linker causing a designated at least one predefined system operation to be performed on said messages by said program-controlled system and providing said address pointer of a termination object means to said one or more predefined system operation;

origination object means comprising ones of said plurality of object means, said origination object means controlling each of said plurality of telecommunication line devices for sending origination messages to said linker, each of said origination messages comprising a symbolic name of a termination object means controlling one of said plurality of telecommunication line devices and a designation of at least one of said predefined system operations;

said termination object means comprising ones of said plurality of object means different from said origination object means, said termination object means controlling each of said plurality of telecommunication line devices responsive to said linker for sending identification messages, said identification messages each comprising a symbolic name of a fabric control object means; and said fabric control object means comprising at least one of said plurality of object means different from said origination object means and said termination object means, for controlling each of said interconnection devices, to establish connections between telecommunication line devices controlled by said origination object means and telecommunication line devices associated with said termination object means.

8. A system in accordance with claim 7 wherein said linker is further responsive to said identification message for causing said termination object means to apply an alerting signal to said telecommunication line device associated with said termination object means;

said termination object means is responsive to detection of an answer response for transmitting an answer message to said linker; and said linker is responsive to receipt of said answer message for transmitting said connection message to said at least one interconnection device.

9. A computer-implemented system for delivering messages in an object-oriented program-controlled system, said system comprising:

a plurality of object means which communicate by messages, said messages each comprising a symbolic name of one of said plurality of object means as a destination object and an argument list, each of said plurality of object means controlling a portion of said system;

a linker responsive to said messages for determining one or more destination addresses for said message by consulting a linker table, said linker table having a plurality of symbolic names and a corresponding plurality of destination addresses, wherein there is at least one destination address for each symbolic name and wherein each of said plurality of objects further includes means for adding itself to said linker table by adding its one or more symbolic name and its address pointer to said linker table, and each of said plurality of objects includes means for removing itself from said linker table by removing its one or more symbolic name and its address pointer from said linker table, so that inter-object communication is not disturbed by such adding and removing, wherein said linker is capable of completing said communication by causing said one or more predefined system operations to be performed on said argument list of said message and providing said determined one or more address pointers of a destination object to said one or more predefined system operations.

* * * * *